United States Patent
Nayar et al.

(10) Patent No.: US 7,176,960 B1
(45) Date of Patent: Feb. 13, 2007

(54) SYSTEM AND METHODS FOR GENERATING SPHERICAL MOSAIC IMAGES

(75) Inventors: Shree K. Nayar, New York, NY (US); Amruta Karmarkar, Palatine, IL (US)

(73) Assignee: The Trustees of Columbia University in the City of New York, New York, NY (US)

( * ) Notice: Subject to any disclaimer, the term of this patent is extended or adjusted under 35 U.S.C. 154(b) by 896 days.

(21) Appl. No.: 10/088,706

(22) PCT Filed: Sep. 20, 2000

(86) PCT No.: PCT/US00/25801

§ 371 (c)(1),
(2), (4) Date: Aug. 13, 2002

(87) PCT Pub. No.: WO01/22728

PCT Pub. Date: Mar. 29, 2001

Related U.S. Application Data

(60) Provisional application No. 60/170,392, filed on Dec. 13, 1999, provisional application No. 60/154,722, filed on Sep. 20, 1999.

(51) Int. Cl.
*H04N 5/225* (2006.01)
*H04N 7/00* (2006.01)

(52) U.S. Cl. .................... 348/207.99; 348/36

(58) Field of Classification Search .......... 348/37, 348/344
See application file for complete search history.

(56) References Cited

U.S. PATENT DOCUMENTS

| | | | | |
|---|---|---|---|---|
| 5,532,737 A | * | 7/1996 | Braun | 348/36 |
| 5,563,650 A | * | 10/1996 | Poelstra | 348/36 |
| 5,760,826 A | * | 6/1998 | Nayar | 348/36 |
| 6,226,035 B1 | * | 5/2001 | Korein et al. | 348/335 |
| 6,304,285 B1 | * | 10/2001 | Geng | 348/36 |
| 6,335,754 B1 | * | 1/2002 | Endo et al. | 348/37 |

* cited by examiner

*Primary Examiner*—David Ometz
*Assistant Examiner*—Luong T. Nguyen
(74) *Attorney, Agent, or Firm*—Baker Botts LLP; Manu J. Tejwani

(57) ABSTRACT

Systems and methods for generating an omnidirectional mosaic image are presented in which a number of images are acquired about an axis of rotational. The images have a large field of view along the axis of rotation and a small field of view or image width in a second direction. The images can be image strips, formed from non-parallel rays directed onto an image sensor (1008), which are formed from a narrow width of parallel rays directed onto imaging sensor (1008). The images are combined to form a spherical mosaic. In the case of overlapping image strips, image combination can be performed by identifying common features in the overlapping regions and aligning consecutive image strips accordingly. A blending algorithm can then be used to improve image fidelity in the overlapping regions.

14 Claims, 20 Drawing Sheets

(a)

(b)

(a)

(b)

(a)

(b)

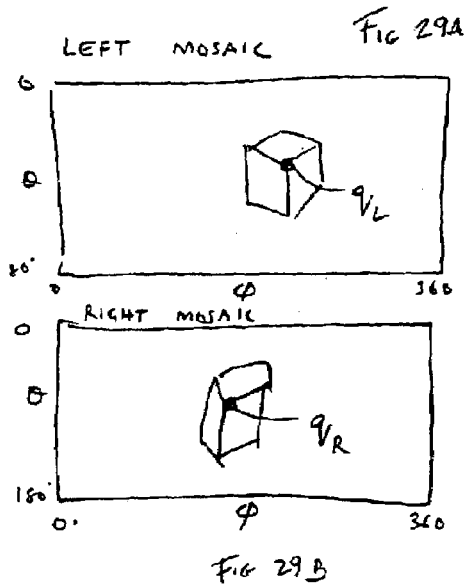
FIG. 29A
FIG. 29B
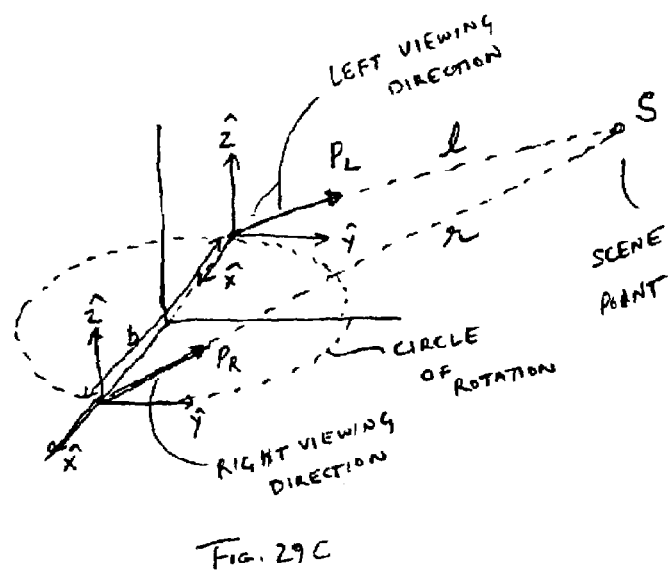
FIG. 29C
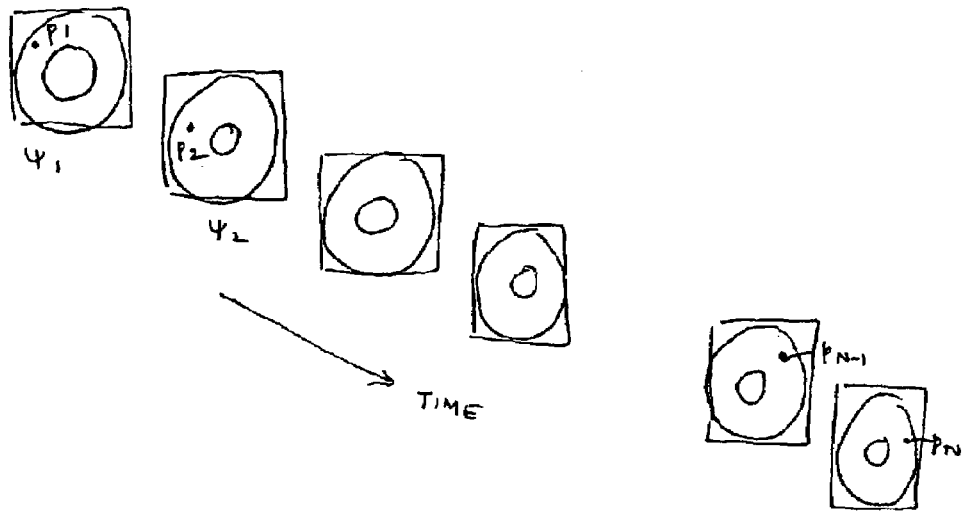
FIG. 30

(a) Left spherical mosaic.

(b) Right spherical mosaic.

SYSTEM AND METHODS FOR GENERATING SPHERICAL MOSAIC IMAGES

The present application claims the benefit of United States Provisional application U.S. Provisional application 60/154,722 filed on Sep. 20, 1999 and entitled "Omnidirectional Mosaicing Using Curved Mirrors" and U.S. Provisional application 60/170,392 filed on Dec. 13, 1999 entitled "360×360 Mosaics".

The subject matter of this application was supported in part by a grant from DARPA ONR/ARPA MURI, Grant No. N00014-95-1-0601 and, therefore, the United States government may have certain rights to the invention.

FIELD OF THE INVENTION

The present invention relates generally to digital imaging and more particularly relates to the acquisition and combination of a plurality of image segments to generate spherical mosaic image data.

BACKGROUND OF THE INVENTION

The generation of high resolution, large field of view images is important in many areas, such as virtual reality, computer vision, robotic navigation and the like. It is generally known that mosaic images can be computed by stitching together multiple images, where the individual images correspond to different views of the same scene. Generally, the different views have approximately the same viewpoint but correspond to different sections of the scene of interest. A variety of techniques for image mosaicing are known. Such techniques generally employ an imaging system that uses a conventional imaging lens to form an image of the scene. A problem with conventional lenses is that they are limited in their fields of view in both image directions. Therefore, to construct a panorama or a complete spherical image, a large number of images need to be captured and processed. In addition, to capture a complete spherical view the imaging systems need to scan the scene in three dimensions without missing any substantial areas. This is difficult to accomplish using conventional camera systems.

An alternate approach is to use a wide angle lens such as a fish eye lens. This approach reduces the number of images since the field of view captured in each image is significantly larger than in the case of conventional images. However, when a fish eye lens is used, the resolution of the image is uniformly distributed over the increased field of view and as a result, such systems are not well suited for high resolution mosaicing.

Catadioptric imaging systems which use a combination of mirrors and lenses to form an image are also known. The use of mirrors provides the designer great flexibility in terms of manipulating the field of view and resolution characteristic of the imaging system. Catadioptric systems have shown promise for wide angle imaging.

Despite their known benefits, known catadioptric imaging systems cannot capture a complete spherical view within a single image. The field of view is typically limited by two factors, namely, a blindspot that results from the mirror (or mirrors) seeing the camera itself and the finite extent of the mirror (or mirrors) that corresponds to a truncation of the field of view. Furthermore, as the field of view of a catadioptric system is increased, such as by increasing the extent of the imaging mirrors, the resolution of the image is naturally reduced. This is because in any given image detector (CCD, film, etc.) the number of picture elements is fixed and an increase in the field of view corresponds to each pixel subtending a larger solid angle with respect to the captured scene.

Several variations of wide angle imaging systems are known. As shown in FIG. 2, a first system includes an image sensor 202, an objective (imaging) lens 204 and a curved (convex or concave) mirror 206. The curved mirror 206 can have a variety of shapes. In the case of a hyperboloidal mirror, if the entrance pupil of the imaging lens is placed at the external (far) focus $F'_1$ of the mirror 206, only the scene rays that approach the near focus $F_1$ of the mirror 206 are imaged by the system. In this case, the near focus of the mirror is the center of projection of the complete catadioptric system.

More compact catadioptric designs are possible using the concept of optical folding which uses multiple mirrors. As shown in FIG. 3, the near focus $F_2$ of the secondary mirror 302 is made to coincide with the far focus $F'_1$ of the primary mirror 304. Then, if the entrance pupil P of the imaging lens 306 is placed at the far focus $F'_2$ of secondary mirror 302, the imaging system captures only those scene rays that approach the near focus $F_1$ of the primary mirror 304, making it the center of projection of the complete imaging system.

A variety of mirror configurations may be used is catadioptric systems, with the mirror shapes being hyperboloidal, ellipsoidal, and paraboloidal. If the requirement that the center of projection should be a single point is relaxed, a variety of other shapes can also be used, such as spherical and conical. In fact, the mirror profiles are not confined to first order or second order profiles but can be higher order polynomials that permit the manipulation of the resolution characteristics of the imaging system.

Catadioptric imaging systems include one or more curved mirrors in the imaging system and the mirrors may be concave or convex. In the case of multiple mirrors, there is at least one curved mirror and one or more of the others could be planar mirrors.

Another embodiment of a catadioptric imaging system is illustrated in FIG. 4. This system includes a parabolic mirror 401, a relay lens 404, an imaging lens 406 and an image detector 408. The relay lens 404 is typically an achromatic lens with a short focal length. The distances between the relay lens 404, the imaging lens 406 and the parabolic mirror 402 are chosen such that only principal rays of light that are orthographically reflected by the parabolic mirror are imaged by the system. These reflected rays correspond to scene rays that approach the focus of the parabola.

Typically, the image captured using a wide angle catadioptric system looks like that illustrated in FIG. 5. This image is donut shaped and has two circles that are of the limits of the imaging system's field of view. The first inner circle B'corresponds to the blindspot that is caused by the primary mirror being obstructed in its view by other mirrors, the imaging lens, or detector. The second (outer) circle L' of the field of view results from the finite extent of the mirrors. As can be seen, such a field of view is 360 degrees in one dimension and less than 180 degrees in the other. It should be noted that the imaging lens and detector need not necessarily be used to image the complete field of view captured by the mirrors. Instead, they may be used to image a smaller section of the donut image in order to increases image resolution (lower the solid angle imaged by each pixel).

SUMMARY OF THE INVENTION

The present invention provides systems and methods for using an imaging system to efficiently scan a complete spherical view of a scene.

In accordance with the present invention, slice image data is acquired by receiving rays over a large field of view in a first direction and a small imaging width in a second direction. At least a portion of the received rays are parallel with each other with respect to the second direction. That portion of the rays which are parallel in the imaging width are directed upon an area of an imaging sensor. Preferably, the directing step includes interposing at least one mirror and at least one lens between a point where the rays are received and the imaging sensor.

The method of acquiring slice image data provides for the large field of view to be approximately 360 degrees. In this case, the area of the imaging sensor receiving the rays is an annular ring having a radial width.

The methods for acquiring slice image data can be used by a slice image camera. A slice camera generally includes an imaging sensor, at least one mirror receiving rays over a large field of view in a first direction and a small imaging width in a second direction, and at least one lens. The at least one lens receives at least a portion of the rays which are incident on the at least one mirror and directs only the portion of the rays which are parallel to each other in the second direction to an area of the imaging sensor.

Numerous arrangements of mirrors and lenses can be employed in forming the slice image camera. For example, a conical mirror can be used in cooperation with a telecentric lens. In addition, multi-mirror configurations are also provided which can reduce the size of the slice camera.

In accordance with a first method of generating a spherical mosaic image, a plurality of image sections are acquired about an axis of rotation. The image sections have a large field of view along the axis of rotation and a small field of view (non-parallel rays) or width (parallel rays) in a second direction. Consecutive images about the axis of rotation are then combined to form the spherical mosaic image.

The images can take the form of image strips, which are formed from a narrow field of view of convergent rays, or image slices, which are formed from a narrow width of parallel rays. The image strip typically corresponds to about 180 degrees or 360 degrees in one dimension of the field of view and only a few degrees in the second direction.

If the rotational position is known, consecutive images can be concatenated using the known rotational positions to form a substantially continuous spherical image about the axis of rotation.

If the rotational position of the images is not known, the images must take the form of overlapping strips. In this case, common features are identified within the overlapping regions of consecutive image strips and the strips are aligned accordingly. Preferably, a blending algorithm is used to improve image fidelity in the overlapping regions.

An imaging system for acquiring an omnidirectional mosaic image in accordance with the present invention includes an image slice camera having a large field of view in a first direction and a small width in a second direction. The image slice camera receives parallel rays of light which are incident on the camera width and directs the parallel rays onto an area of an imaging sensor. A rotational drive system is operatively coupled to the image slice camera. The rotational drive system rotates the image slice camera along an axis of rotation which is substantially parallel to the first direction. A control unit is operatively coupled to both the rotational drive system and image slice camera. The control unit receives the image slice data from the image slice camera and records corresponding rotational positional information of the rotational drive system. The control unit acquires a plurality of image slices at known rotational positions about the axis of rotation and concatenates the image slices to form a spherical mosaic image data. An output device is generally coupled to the control unit for displaying a spherical mosaic image from the spherical mosaic image data. The output device can take the form of a video output device or hardcopy, such as a printer.

A slice camera can be formed with at least one mirror receiving the parallel rays and directing the rays through the entrance pupil of at least one lens and onto an imaging sensor. The mirror can take several forms, such as a non-convex mirror section or a conical mirror section.

Multi-mirror embodiments can also be employed with combinations of various mirror shapes that direct only the parallel rays incident on the camera to the imaging sensor. For example, a slice camera can be formed with a first mirror section receiving the parallel rays, a second mirror section and an imaging sensor. The second mirror is positioned to receive the parallel rays from the first mirror and direct the rays through an entrance pupil of a lens and onto an imaging sensor. The second mirror section can exhibit a near focus and a far focus. In this case the first mirror is positioned to project the received rays through the near focus and onto the second mirror section which directs the rays to the image sensor located at a position proximate the far focus. Preferably, the near focus is located in front of the first mirror section and the far focus is located behind the first mirror section.

The imaging sensor for the system can be any light sensitive device such as a CCD imager, a CMOS imager or photographic film. The imaging sensor should have image pixels distributed in at least two dimensions (e.g., X-Y) and the parallel rays of the image sheets are directed onto a substantial portion of the sensor. The distribution of pixels on the imaging sensor can be distributed only within, or concentrated within, the portion where the rays are directed, such as in an annular ring pattern. This facillitates lower cost imaging sensors (less pixels used) or higher resolution imaging sensors (same number of pixels concentrated into the active portion of the sensor) being formed. In the case of a video system, the output can be continuously captured while the imaging system is rotated with respect to a convenient point of rotation. Since the image sections generally have 180 degrees or greater field of view in one dimension, a single rotation of 180 degrees or 360 degrees (about a single axis) of the slice camera (or strip camera) can provide a complete spherical scan of the scene of interest. The rotation can be accomplished by mounting the slice camera on a tripod stand, a motorized rotary stage or by simply holding the imaging system by hand and rotating it around an axis.

The slice camera has a center of projection and the axis of rotation can be radially offset from the center of projection. In this case, stereoscopic image data can be acquired in a single rotation about the axis of rotation. For instance, two views can be presented as a single image where the two views are color coded. Then, using eye glasses with different color filters for the left and right images, the observer can perceive the depths of objects in the scene. Alternatively, the observer can wear a head-mounted display and the two images can be provided to the left and right displays of the head-mounted display. In this mosaic, the stereo baseline (in the case of the human visual system, this would be the distance between the eyes) which is determined by the radial offset of the camera from the axis of rotation remains substantially constant over the entire mosaic.

Preferably, a mapping algorithm is provided that enables a user to generate perspective views from the omnidirectional mosaics. Such views can be used to navigate around the 360 degree×360 degree field of view. A variety of existing mapping techniques can be used to map from spherical mosaics to perspective views.

The captured stereoscopic data can be used to compute an omnidirectional (e.g., 360 degree×360 degree) depth map of the scene. Hence, a robust estimate of the coordinates of each scene point can be computed from the captured data.

The rotation of the imaging system and the computation of the omnidirectional data may be accomplished in real-time using high speed motors and high performance processors. This enables real-time systems where the information (be it regular mosaic, stereo mosaic or depth map) is computed substantially continuously and hence can vary with changes in the scene (such as moving objects).

The present invention provides an omnidirectional brightness/color image of a scene, an omnidirectional stereoscopic image of a scene and an omnidirectional depth map of a scene using a single 180 degree or 360 degree rotation of a catadioptric imaging system. Though it is desired to compute complete omnidirectional visual data, the field of view does not have to be a complete sphere but can include small blindspots (for instance, at the poles of the sphere). In addition, to improve image resolution, it may be desirable to only form the mosaic over a portion of the spherical field of view. Hence, the term ommidirectional data as used herein means data corresponding to a substantial portion of a spherical view and data corresponding to panoramic data over a substantial portion of a spherical view.

BRIEF DESCRIPTION OF THE DRAWINGS

FIGS. 29A and 29B illustrate an exemplary point in a scene as viewed from the left and right mosaics, respectively;

FIG. 29C is a perspective model illustrating the calculation of the depth of a scene point;

FIG. 30 illustrates the displacement of a point in the scene over time in a series of acquired images;

DETAILED DESCRIPTION OF PREFERRED EMBODIMENTS

Figure 8A:
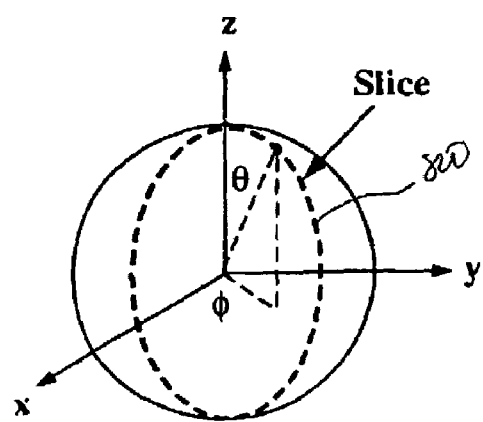
FIGS. 8A and 8B illustrate that mapping of an image "slice" of a spherical image onto a plane, respectively.
Figure 8B:
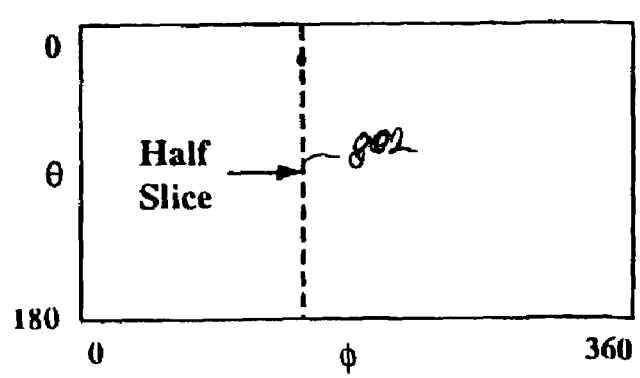
Figure 7A:
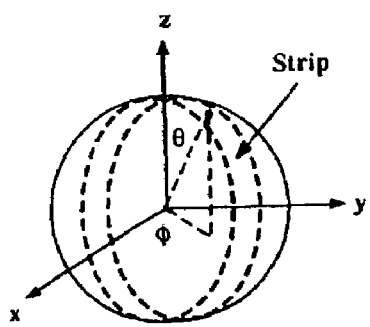
FIG. 7A is a perspective view of an image "strip"
Figure 7B:
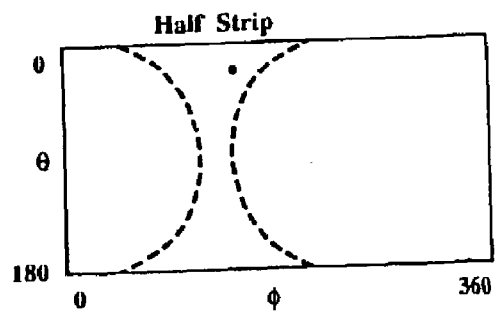
FIG. 7B is a graph illustrating the mapping of an image "strip" of the spherical image of FIG. 7A onto a plane.

The present systems and methods are directed to the generation of omnidirectional mosaic images using acquired image "strips" or image "slices." Referring to FIG. 7A, an image strip is a section of the spherical image having a narrow field of view which is generated by converging rays incident on the imaging system being directed onto an imaging surface. FIG. 7B illustrates the mapping of the spherical image strip onto the θ-ϕ) plane. As used herein, an image slice 800, which is graphically illustrated in FIG. 8A, is formed by parallel rays incident on the imaging system being acquired by an image sensor over a thin width of the spherical image. As illustrated in FIG. 8B, because the image slice is acquired from a narrow width of parallel rays, the image slice maps into a straight line 802 in the 0-ϕ plane. It will be appreciated that the term rays as used herein is not limited to radiation in the visible light spectrum but generally refers to high-frequency electromagnetic radiation, including but not limited to visible light, infrared radiation, ultraviolet radiation, x-ray radiation and the like.

As used herein, the term image section will be used to refer to both image slices and image strips. Further, the term "camera" will be used to refer to a photo imaging subsystem, from the point rays are incident on the sub-system through to the imaging detector, regardless of the nature of the optics interposed therein. A slice camera refers to a photo imaging subsystem for acquiring image slice data from incident parallel rays, and a strip camera refers to a photo imaging subsystem for acquiring image strip data from incident rays.

Although the present invention does provide for full 360×360 spherical mosaic imaging, it is not limited to applications with complete spherical mosaics. Accordingly, the term omnidirectional mosaic and omnidirectional data as used herein refers to images and data corresponding to a substantial portion of a spherical view and/or data corresponding to panoramic data over a substantial portion of a sphere.

Figure 1:
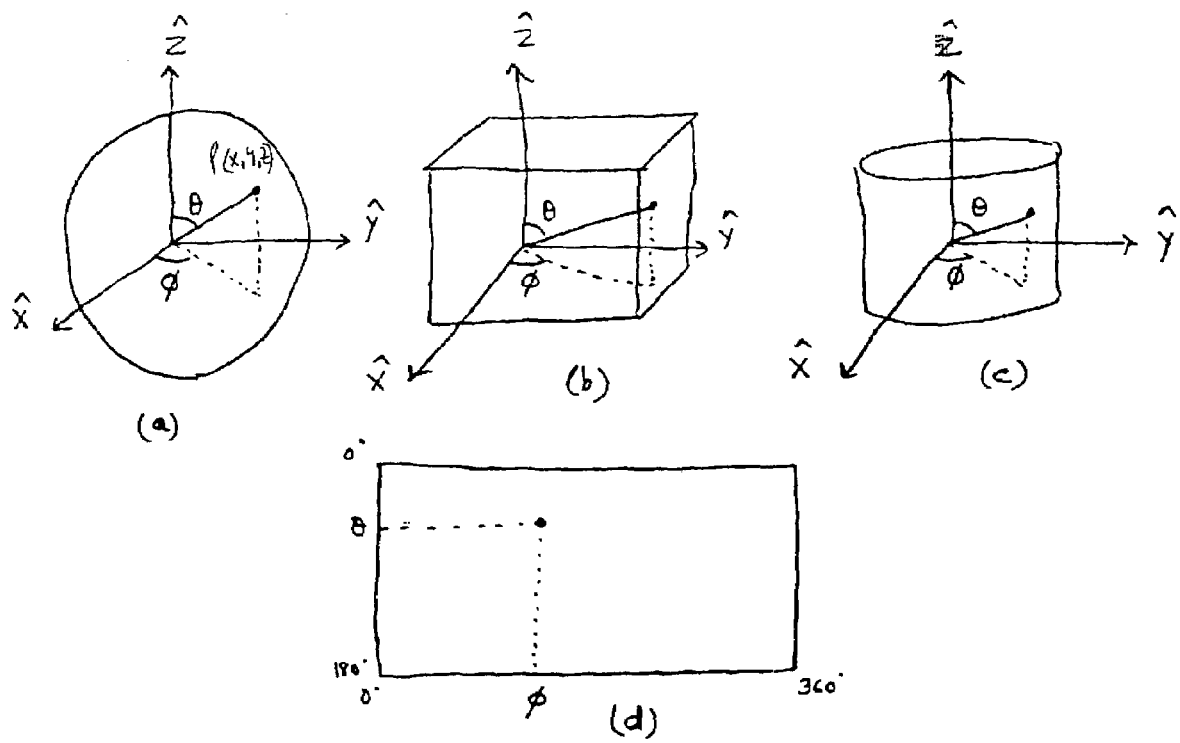
FIGS. 1A through 1D illustrated representations of omnidirectional data in a different coordinate systems.
Figure 2:
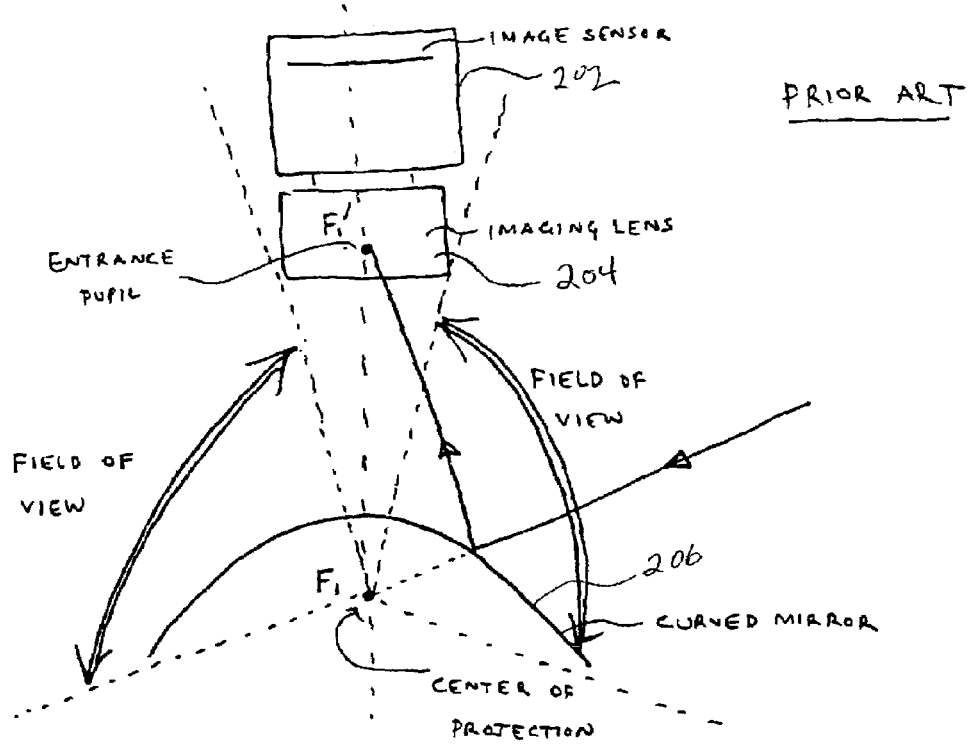
FIG. 2 is a first embodiment of a catadioptric wide angle imaging system, known in the prior art.
Figure 3:
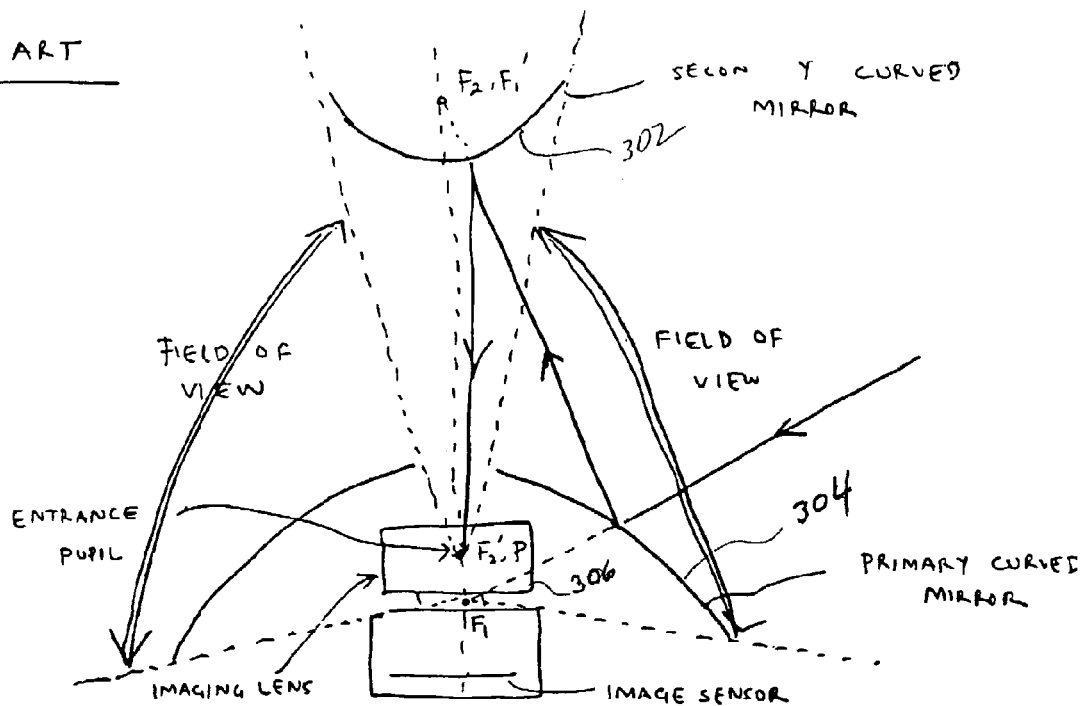
FIG. 3 is an alternate embodiment of a catadioptric wide angle imaging system using a primary mirror and secondary mirror, known in the prior art.
Figure 4:
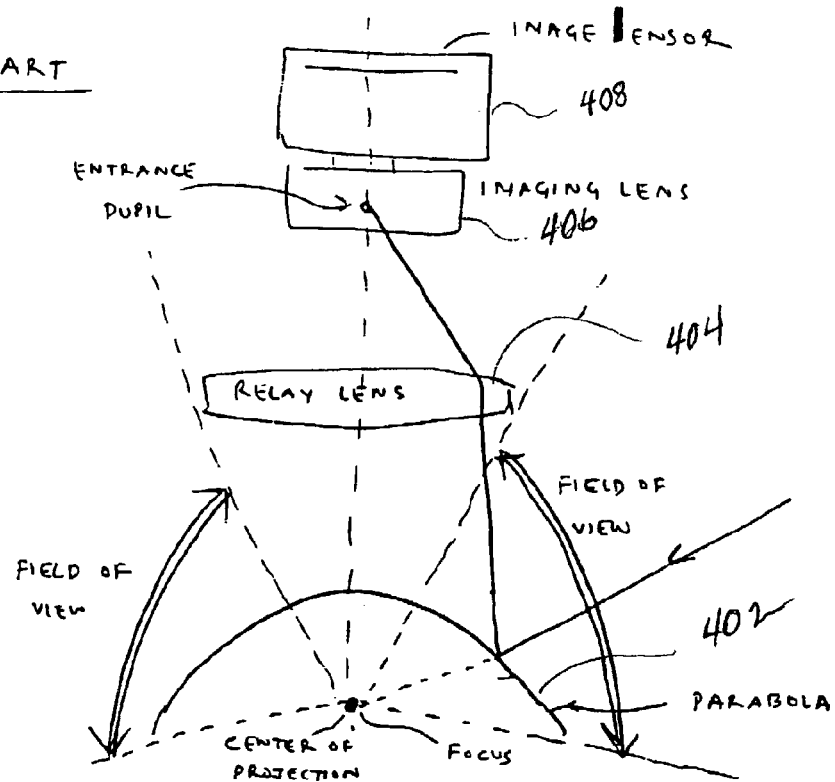
FIG. 4 is an alternate embodiment of a catadioptric wide angle imaging system, known in the prior art.
Figure 5:
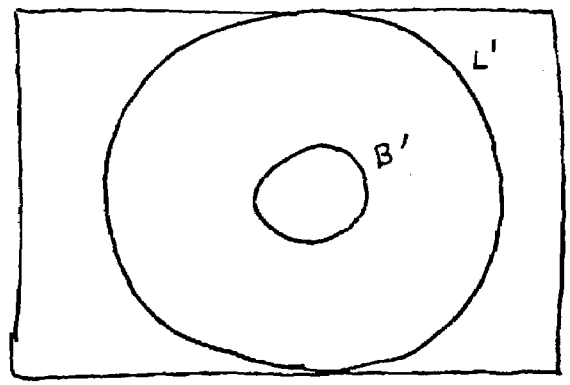
FIG. 5 is a diagram illustrating an exemplary imaging area produced by a catadioptric imaging system known in the art.

To compute omnidirectional visual information, a convenient representation or data structure must be chosen. The omnidirectional data may be represented in a variety of ways, some of which are shown in FIG. 1. Each point can be represented by the polar angles (θ, ϕ). The resulting data may be stored in the form of (a) a discretized sphere, (b) a discretized cube or cuboid, (c) a discretized cylinder with top and bottom faces or in the form of (d) a spherical panorama that is a two-dimensional representation of the (θ, ϕ) space. The exact representation is not critical to the imaging techniques and mosaicing algorithms presented assuming that all stored points, irrespective of the representation, can be mapped to their (θ, ϕ) coordinates.

Figure 6A:
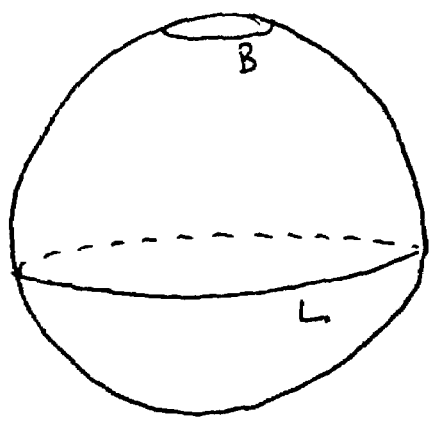
FIGS. 6A and 6B are perspective views illustrating a spherical imaging area generated by combining a small number of wide angle images from a catadioptric imaging system.
Figure 6B:
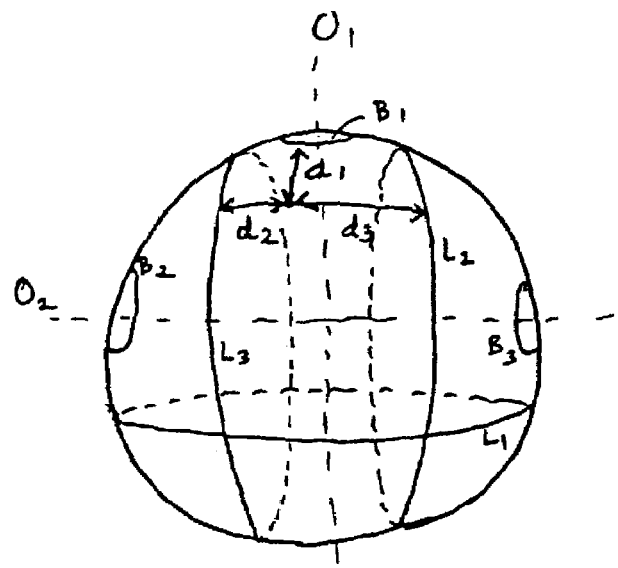

FIG. 6A illustrates the field of view of a typical catadioptric imaging system on a unit sphere. The circle B on the sphere corresponds to the blindspot and the circle L is the outer limit of the field of view. As shown in FIG. 6B, three overlapping images from a conventional catadioptric imaging system may be sufficient to capture the complete sphere by using the orientations (directions of the optical axis of the imaging system) $O_1$, $O_2$ and $O_3$.

The overlapping image regions will generally differ from each other slightly due to inaccuracies in the imaging system, illumination changes during image capture, and variations in the exposures of the three images. To handle such variations, a blending algorithm can be used to calculate the brightness and or color at each pixel in an overlap region of the spherical field of view as a weighted combination of the pixel's brightness and or color in the individual view. The weights can be the shortest distances between the pixel under consideration and the boundaries of the individual fields of view. This is illustrated as d1, d2, and d3 in FIG. 6B. Therefore, the brightness at the point shown in FIG. 6B may be calculated using the known equation:

$$I = \frac{d_1 I_1 + d_2 I_2 + d_3 I_3}{d_1 + d_2 + d_3} \tag{1}$$

For a typical catadioptric imaging system, a minimum of three views would be needed to capture the complete sphere of view.

Preferably, the spherical mosaic is generated using image sections which are acquired in a single rotation of a camera about a single axis of rotation. In the case of an image strip, the field of view of the imaging system is reduced to only a few degrees in one dimension. For example, a strip can be 360 degrees in one dimension and of relatively small field of view in the other dimension. In this case, a rotation of 180 degrees is sufficient to capture the entire region. Alternatively, the strip can exhibit 180 degrees in one dimensions and again a relatively small field of view in the other dimension. In this latter case, the image resolution is improved and a 360×360 image is acquired by a full 360 degree rotation of the imaging camera.

Rotation of the catadioptric imaging camera can be accomplished in a number of ways. For example, the system can be rotated using a motorized stage with a single axis of rotation. In this case, the rotation between images can be precisely determined and performed automatically via computer control. Alternatively, the imaging camera can be mounted on a tripod and manually rotated about the axis of rotation. In this case, the rotational position of the camera may be known, such as by using a sensor or by reading from a rotation dial on the tripod, or it may be unknown. Alternatively, the system may be rotated approximately about its center of projection by a human by simply holding it in his/her hand. In this case, the rotation between consecutive images is unknown and must be automatically recovered from the captured images.

Figure 9:
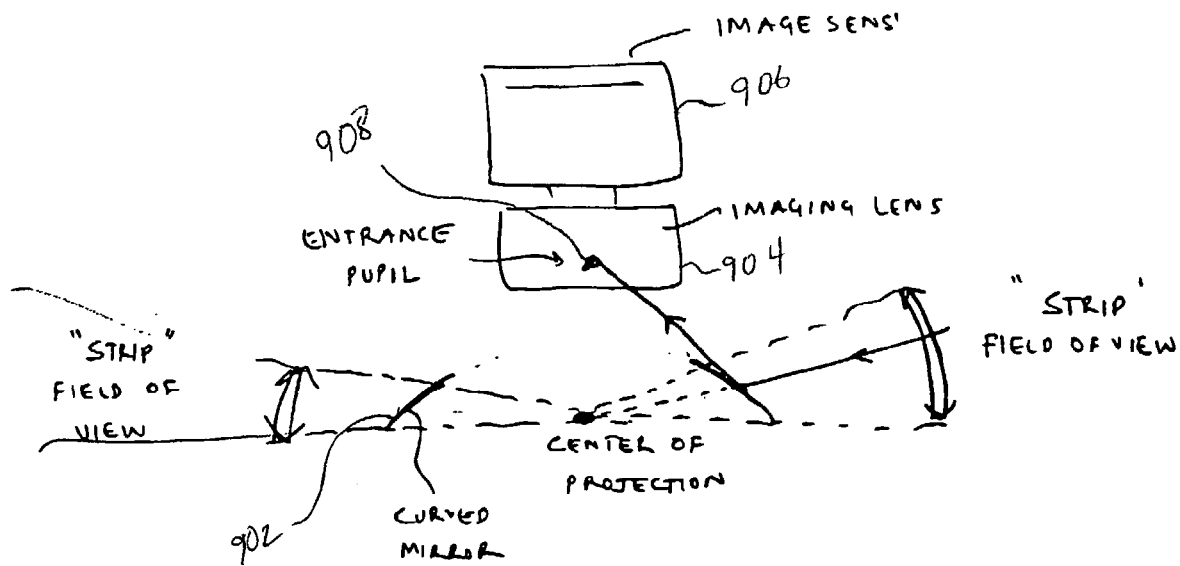
FIG. 9 is a schematic diagram of a catadioptric imaging system used for the acquisition of image strips in connection with the practice of the present spherical mosaicing imaging method.

FIG. 9 shows an embodiment of a catadioptric imaging system that produces a thin 360 degree strip of the field of view. The system includes a section of a curved mirror 902 which is placed in front of an imaging lens 904 that directs the convergent rays of the strip onto an imaging sensor 906, such as a two-dimensional CCD detector. An advantage of this system is that the resolution of the image of strip can be significantly greater than in the case of a pure lens systems such as a fish eye lens. This arises from the fact that in the case of curved mirrors, the catadioptric image increases in resolution approaching the edge (boundary L) of the field of view. It has been shown that the resolution of the imaging system is:

$$\frac{dA}{d\Omega} = \frac{r^2 + z^2}{(c-z)^2 + r^2} \frac{dA}{dw} \quad (2)$$

where c is the distance between the near and far foci of the mirror 902, which is also the distance between the center of projection and the entrance pupil 908 of the imaging lens 904. Therefore, the resolution of the complete imaging system increases with r and is maximum at the periphery of the field of view (which corresponds to the boundary L on the sphere). Therefore, unlike a fish eye lens, the catadioptric system of FIG. 9 captures an image strip that has highest resolution within the 180 degree or 360 degree strip.

Figure 10:
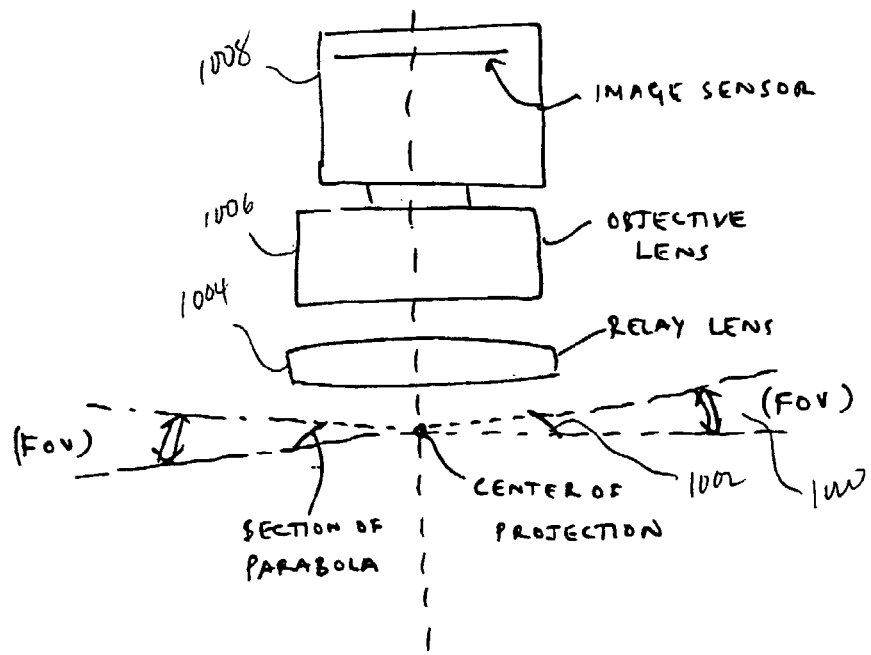
FIG. 10 is a schematic diagram of an alternate embodiment of a catadioptric imaging system used for the acquisition of image strips in connection with the practice of the present spherical mosaicing imaging method.

An alternate embodiment of a catadioptric imaging system is shown in FIG. 10. Referring to FIG. 10, the rays from within the field of view 1000 of the strip are directed onto a section of a parabolic mirror 1002 and to an image sensor 1008. The mirror 1002 directs the rays onto a relay lens 1004 which focuses the rays through an objective lens 1006 and onto the imaging sensor 1008. In this case, the resolution of the catadioptric system is known to be:

$$\frac{dA}{d\Omega} = (r^2 + z^2)\frac{dA}{d\omega} \quad (3)$$

where, z(r) is the equation of the profile of the parabola:

$$z = \frac{h^2 - r^2}{2h} \quad (4)$$

where, h is the parameter of the parabola. For instance, the resolution of the image for scene rays that are 90 degrees with respect to the optical axis is twice that for the scene ray that is along the optical axis. Hence, the thin strip is guaranteed to have the maximum image resolution.

Figure 11:
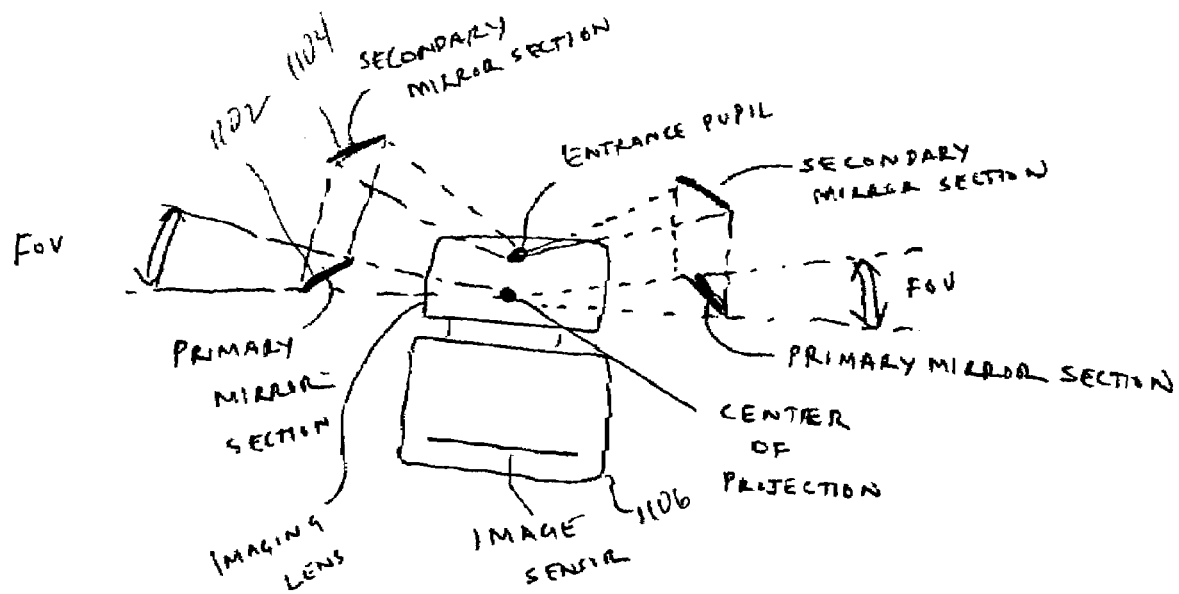
FIG. 11 is a schematic diagram of an alternate embodiment of a catadioptric imaging system used for the acquisition of image strips in connection with the practice of the present spherical mosaicing imaging method.

Thin-strip catadioptric imaging systems can also be constructed using multiple mirrors. Multiple mirrors can further reduce packaging size as well as compensate for the slight field curvature that remains in a single mirror system. Such a system is shown in FIG. 11. A convex primary mirror 1102 and a concave secondary mirror 1104 can be used to introduce field curvatures in opposing directions that tend to cancel the effects of each other as the rays are directed to the imaging sensor 1106. As in the conventional systems, if the mirrors have conic sections, they can be arranged so as to ensure that the center of projection of the imaging system is the near focus of the primary mirror.

Thin-strip cameras can be constructed from a variety of mirrors. The mirrors can be parabolic, hyperbolic, ellipsoidal, conical, spherical or planar. Alternatively, the mirrors can be higher order surfaces that are used to achieve greater resolution within the strip. When the mirrors are not parabolic, hyperbolic or ellipsoidal, the center projection is most likely not a single point but rather a locus of viewpoints. In such cases, the locus is expected to be compact enough to be approximated by a single point.

The acquired image sections are combined to form a resulting omnidirectional mosaic image. If the camera rotation is performed in a controlled manner such that the rotational position of each image section is known, the image sections or slices can simply be concatenated to form a spherical image. In those cases where the rotational position is not known, feature matching can be performed in overlapping strip regions to identify common features. These common features are then used as reference points to combine the overlapping image strips. In the region of overlap, a blending algorithm can be employed to restore the color and intensity of the image data.

Figure 12:
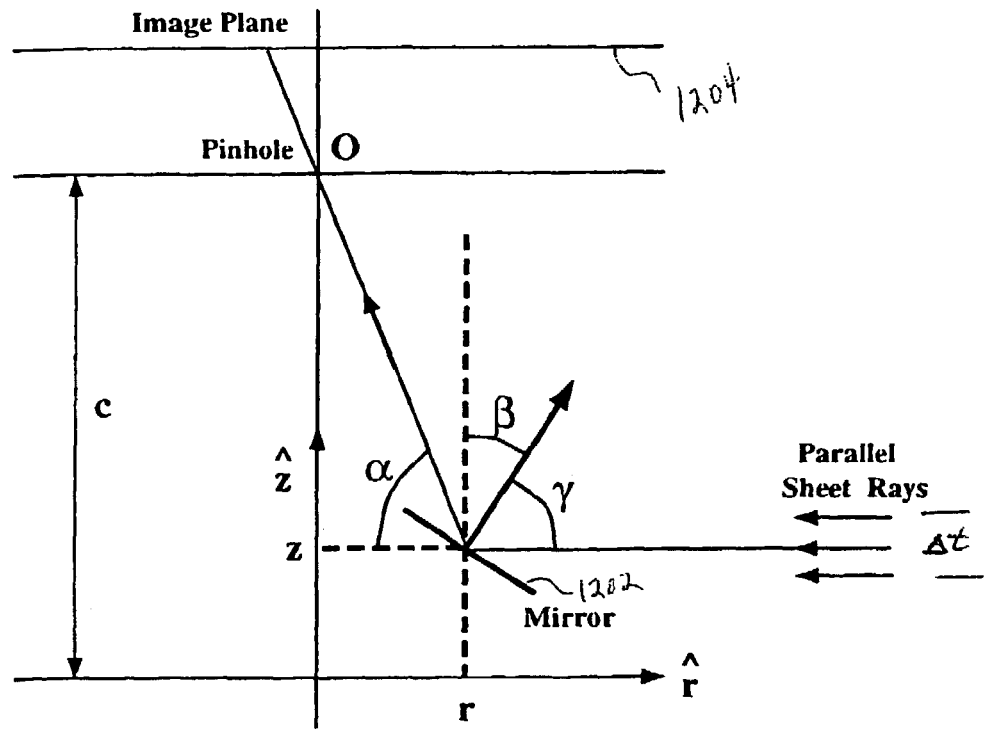
FIG. 12 is a graph illustrating the operating principle of acquiring an image "slice" in accordance with the present invention.
Figure 13:
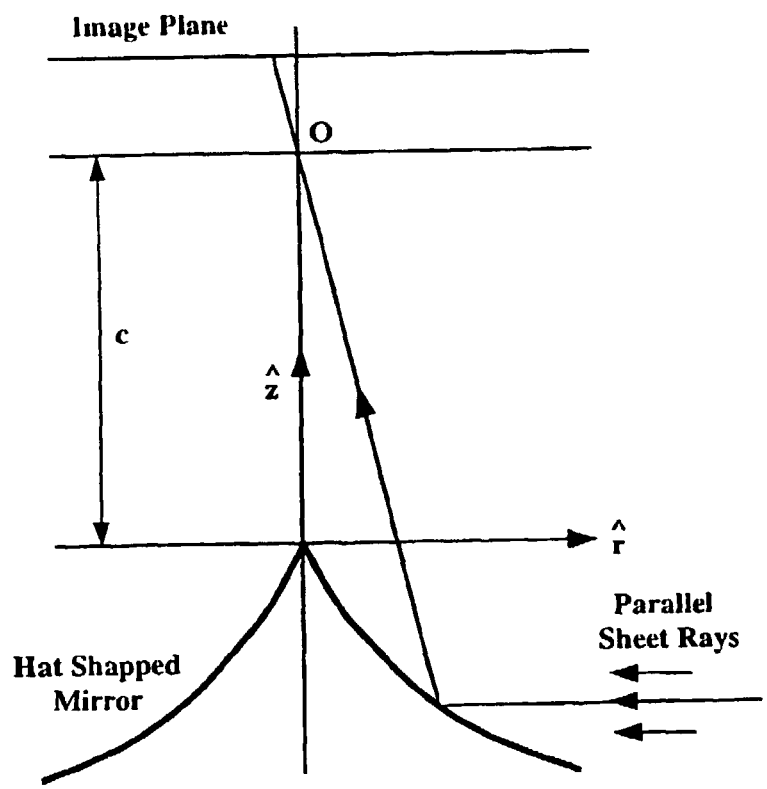
FIG. 13 is a graph illustrating the application of a "hat shaped" mirror used for acquiring an image "slice" in accordance with the present invention.
Figure 14:
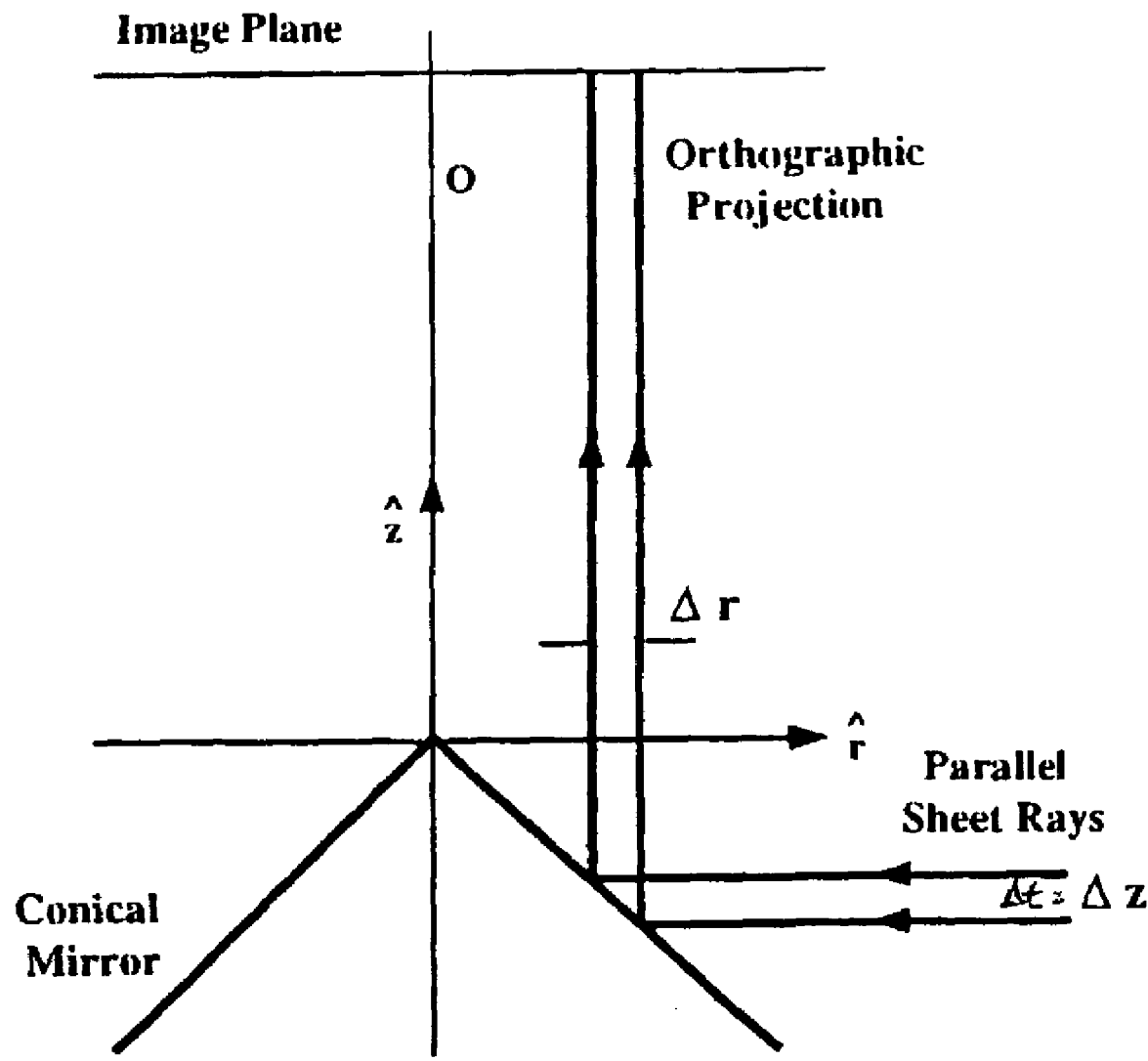
FIG. 14 is a graph illustrating the application of a conic mirror used for acquiring an image "slice" in accordance with the present invention.

While catadioptric imaging systems capable of acquiring image strips are known, this is not the case with the acquisition of an image slice. As noted above, in the case of the image slice, only rays from the source which are parallel to each other with respect to the direction of the slice thickness and are incident on the camera are detected. Thus, the catadioptric imaging system must be modified such that only those parallel rays of the image slice thickness are directed to the entrance pupil of an imaging lens and then onto as imaging detector. FIG. 12 graphically illustrates a mathematical model for deriving various mirror profiles which can achieve this result. In FIG. 12, a cross section of mirror 1202 is illustrated. In practice, this mirror circularly extends around a substantial portion of axis z to establish a wide field of view in a first direction. This wide field of view can be 360 degrees around the axis or a substantial portion or portions thereof. The parallel sheet of rays are shown incident on the mirror 1202 substantially parallel to the image plane 1204 ($\beta+\gamma=90$). In this arrangement, the sheet of rays, which are parallel in a direction corresponding to the thickness of the sheet ($\Delta t$), correspond to a substantially planar sheet. Analysis of the model of FIG. 12 yields an equation for the mirror profile where $\beta+\gamma=90$ of:

$$z = c - 2\sqrt{k}\sqrt{|r|+k} \quad (5)$$

where k is a constant of integration. For the case of Z=0 at r=0, k–c/2 which results in the "hat-shaped" profile illustrated in FIG. 13. In the case of orthographic projection, the angle $\beta$ (FIG. 12) is $\pi/4$ and the resulting mirror profile is a cone, as illustrated in FIG. 14. While not shown in FIG. 14, one or more lens is generally interposed between the imaging plane and the conical mirror such that only those rays which are part of the desired parallel sheet or slice of rays are projected onto an imaging sensor or the imaging plane.

It will be appreciated that the system can be adapted such that parallel rays from other directions can be directed to the image plane. In such systems, the sheet of parallel rays corresponds to a conical sheet around the axis z. Again, the rays are substantially parallel in a second direction which corresponds to the thickness of the sheet ($\Delta t$).

Figure 15:
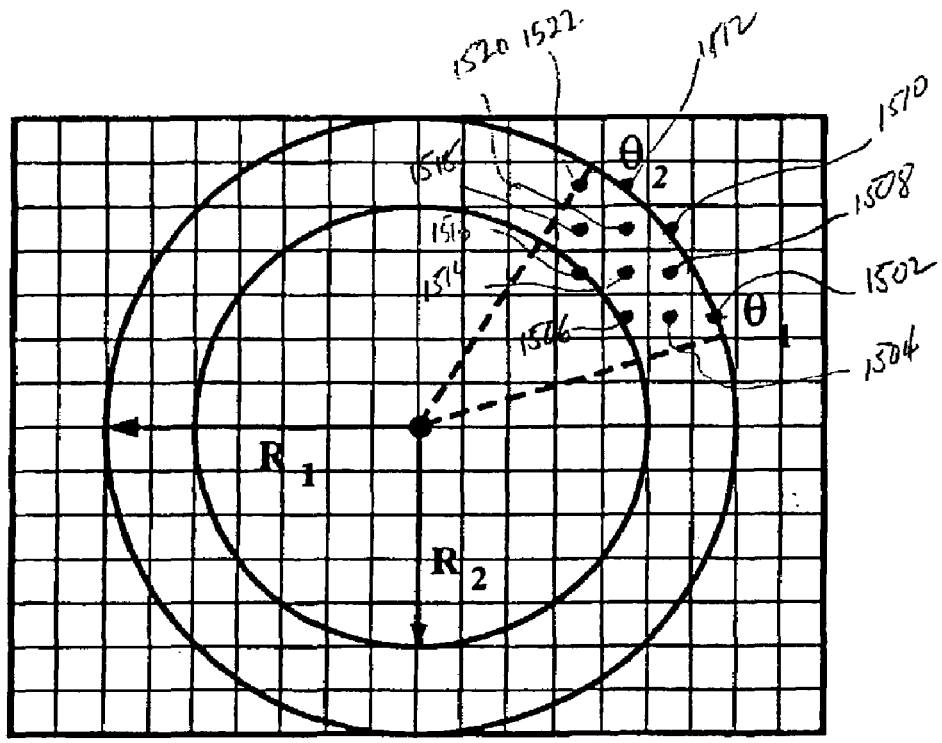
FIG. 15 is a graphical representation illustrating the mapping of image slice data points onto a region of an image sensor.
Figure 16A:
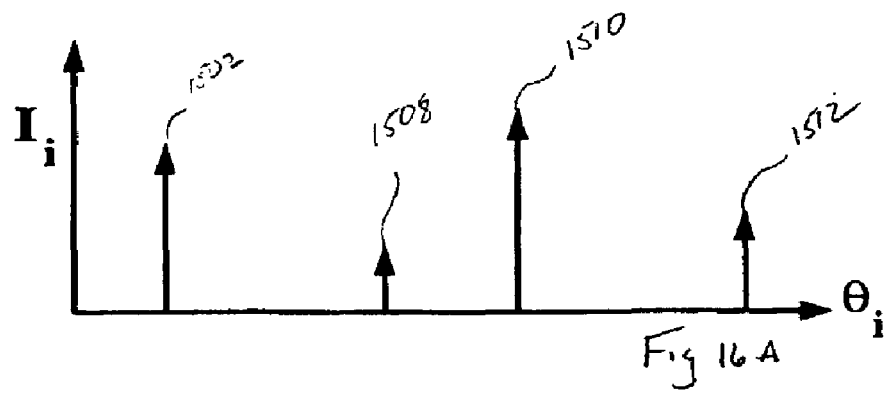
FIG. 16A is an intensity graph illustrating the data points acquired by an image strip along the outer circle of the graph in FIG. 15.

A slice camera in accordance with the present invention is one which receives a thin sheet of parallel rays over a large field of view around an axis (e.g., 180 or 360 degrees) and projects these rays onto a large number of image pixels over an area of an image sensor with a respective angular displacement among at least a majority of the pixels. This is illustrated in FIG. 15, wherein the acquired image points from a portion of a 360 degree field of view slice are mapped over the angle of rotation from $\theta 1$ and $\theta 2$ into the wide disc-shaped section of the rectangular imaging sensor defined by the region R1–R2. This mapping of the thin sheet of parallel rays onto the pixels (1502–1528) in a large portion of the sensor area and distributed over the rotational angle $\theta$ provides enhanced resolution for the present slice cameras. This can be represented by intensity values in the graph of FIG. 16B. In contrast, if a conventional wide angle imaging system were used to capture an equivalent width section of the scene, that portion of the image would map to only to a single circle, e.g., that defined by R1, and would be sampled by far fewer pixels on the imaging sensor, as can be seen in the intensity graph of FIG. 16A.

Figure 16B:
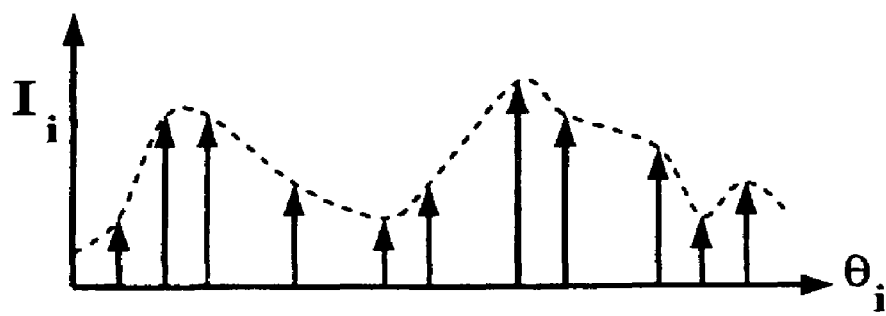
FIG. 16B is an intensity graph illustrating the data points acquired by an image slice, which is mapped into the region between the inner circle and the outer circle of the graph in FIG. 15.

Referring to FIG. 16B, it can be appreciated that the pixels distributed within the region θ1, θ2 and the width R1–R2 exhibit a non-uniform distribution over θ. By interpolating these data points and then re-sampling the interpolated data, a uniform distribution of interpolated samples can be provided, if desired.

Also, referring to FIG. 15, it is apparent that the rays from the image slice are directed onto only a known portion of the imaging sensor (in the case of FIG. 15, an annular ring). This can be used advantageously to form lower cost or higher resolution imaging sensors for a slice camera. To form a lower cost sensor, the pixels outside of the active portion of the sensor need not be provided. To form a higher resolution sensor, the same number of pixels used in a conventional rectangular sensor can be concentrated within the active portion of the sensor. Of course, conventional rectangular sensors can also be used in the practice of the present invention.

Figure 17:
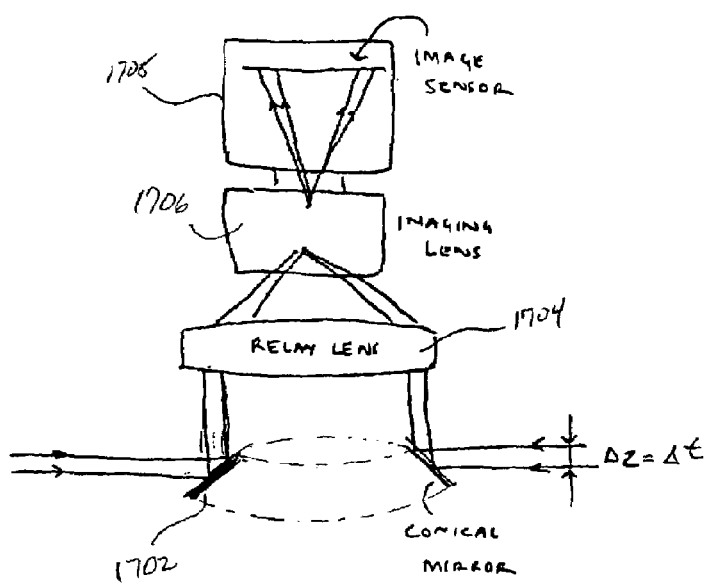
FIG. 17 is a first embodiment of a catadioptric imaging system for acquiring image "slices" using a conical mirror in accordance with the present invention.

FIG. 17 is a schematic diagram illustrating a first embodiment of a slice camera. The slice camera employs a conical mirror section 1702 which receives parallel rays over a small slice width. In this case, the system is intended to be orthographic such that Δt=Δz, where z is the vertical axis of the conical mirror, which is normal to the imaging plane. As discussed in connection with FIG. 14, the conical mirror orthogonally directs the incident rays onto a relay lens 1704. The relay lens 1704 directs the rays onto the entrance pupil of an imaging lens 1706 which in turn directs the rays onto an imaging sensor 1708. This arrangement of the relay lens and imaging lens can be referred to as a telecentric lens. In this arrangement, the parallel rays (and only the parallel rays) from the width of the slice are directed onto the image sensor. The parallel rays are directed onto an area of the imaging sensor 1708 in an annular ring having a radial thickness as illustrated in FIG. 15. Since the relay lens ensures that only orthographically reflected rays are imaged by the sensor, and since the mirror is a cone with its axis aligned with the direction of orthographic reflection, the scene rays that are imaged in any given angle within the 360 degree strip are all parallel to one another. If the conical section is small, these parallel rays will be very close to one another.

Figure 18:
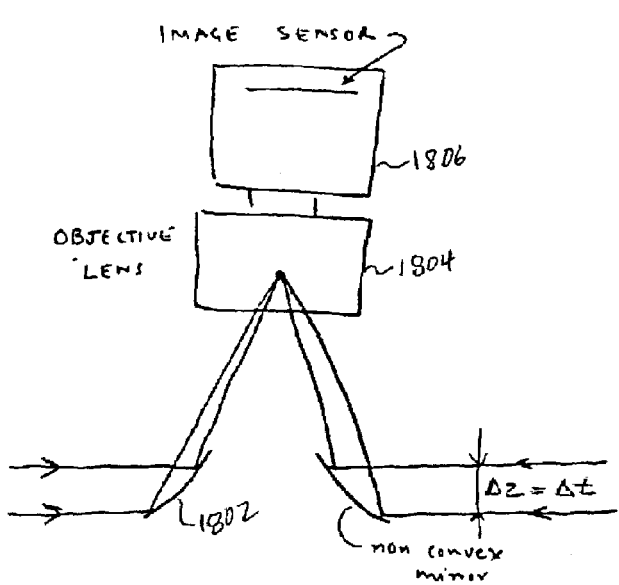
FIG. 18 is an alternate embodiment of a catadioptric imaging system for acquiring image "slices" using a non-convex mirror in accordance with the present invention.
Figure 19:
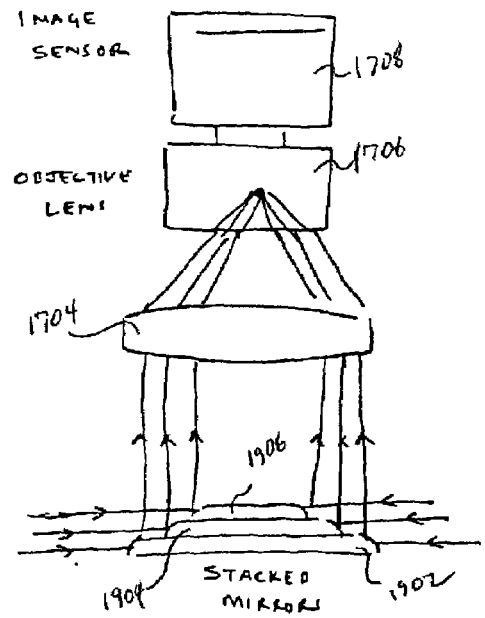
FIG. 19 is an alternate embodiment of a catadioptric imaging system for acquiring image "slices" using a stacked mirror in accordance with the present invention.

A variety of other slice camera designs may be used to capture high resolution slice data. For instance, instead of a conical mirror and an orthographic imaging system, a perspective imaging system can be used with a non-convex mirror as shown in FIG. 18. As developed in connection with FIG. 13, such an embodiment would include a section of mirror 1802 with a profile suitable for focusing the incident parallel rays onto the entrance pupil of an objective lens 1804 and ultimately onto the imaging sensor 1806. Further, the same data can be obtained using a stacked set of thin mirror sections. 1902, 1904, 1906 that have the same field of view but are of different diameters, as illustrated in connection with FIG. 19. For example, the mirror sections can take the form of a stack of parabolic mirrors used in conjunction with an orthographic imaging system similar to that described in connection with FIG. 17.

Figure 20A:
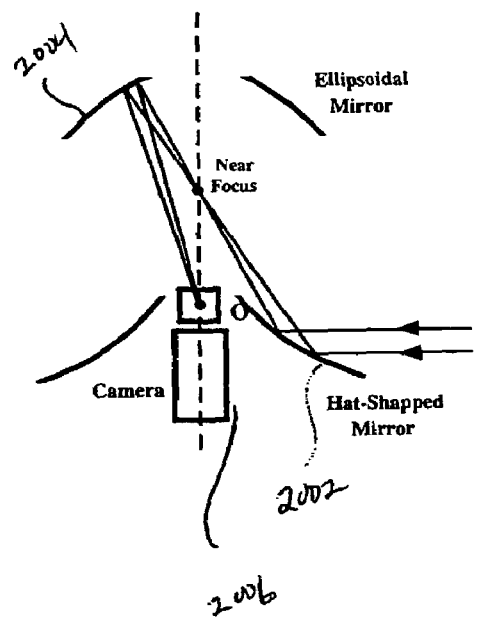
FIGS. 20A and 20B are alternate embodiments of catadioptric imaging systems for acquiring image "slices" using multiple mirrors in accordance with the present invention.

FIG. 20A illustrates a further alternate embodiment of a slice camera which employs a primary mirror 2002 and a secondary mirror 2004 to direct the incident parallel rays of the image slice onto the entrance pupil of an imaging lens 2012 and onto an image sensor 2006. As illustrated in FIG. 20A, the primary mirror 2002 can take the form of the hat shaped profile as discussed in connection with FIG. 13 and the secondary mirror can be an ellipsoid mirror. In this case, the profile of the primary mirror is determined such the incident rays are directed through the near focus of the ellipsoid mirror and the entrance pupil of lens 2012 is placed at the far focus of the ellipsoid mirror 2004. This provides a configuration where the image sensor 2006 is placed within the perimeter of the primary mirror, thus providing a relatively compact design.

Figure 20B:
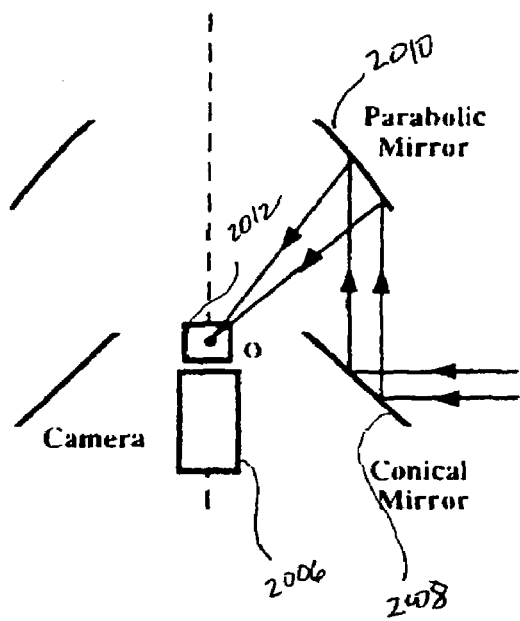

FIG. 20B illustrates another alternate embodiment of slice camera using multiple mirrors. In this case, the parallel rays of the desired image sheet are incident on a conical mirror section which directs the rays, which are still parallel, onto a second mirror 2010 which is parabolic. The parabolic mirror 2010 then focuses the parallel rays onto the entrance pupil of an imaging lens 2012 and onto an imaging sensor 2006.

In the implementations discussed above, the fields of view (strips) or slice widths are approximately perpendicular to the optical axis of the imaging system. It should be appreciated, however, that the field of view or slice width can be at any other angle with respect to the optical axis. For example, as noted in connection with FIG. 12, this results in the image slice data corresponding to a conical sheet of thickness Δt around the axis of the imaging system (z).

It will be appreciated that, as with conventional imaging systems, resolution can be improved by projecting a smaller field of view onto an equivalent area of the imaging sensor. For example, by configuring the optics such that the sheet of rays over a 180 degree field of view are projected onto a substantial area of a rectangular imaging sensor, the resolution can effectively be increased as compared to a 360 degree field of view camera. In such a case, only a half annular image is acquired and the camera is then rotated 360 degrees, rather than 180 degrees, in order to capture slice image data for a full 360×360 mosaic. In the case where the aspect ratio of the imaging sensor is not equal to one, such as in conventional video cameras, the sheet of rays can be made to fill the longer of the two image dimensions to more effectively use the area of the sensor and thereby obtain higher resolution (more pixels in the image section). Of course, a further extension of this principle is to limit the panorama or mosaic image to less than 360×360 viewing. For example, the magnification of the imaging lens can be increased such that rays from smaller sections of the mirror (e.g., 90 degrees) are directed to an equivalent area of the imaging sensor.

Figure 21:
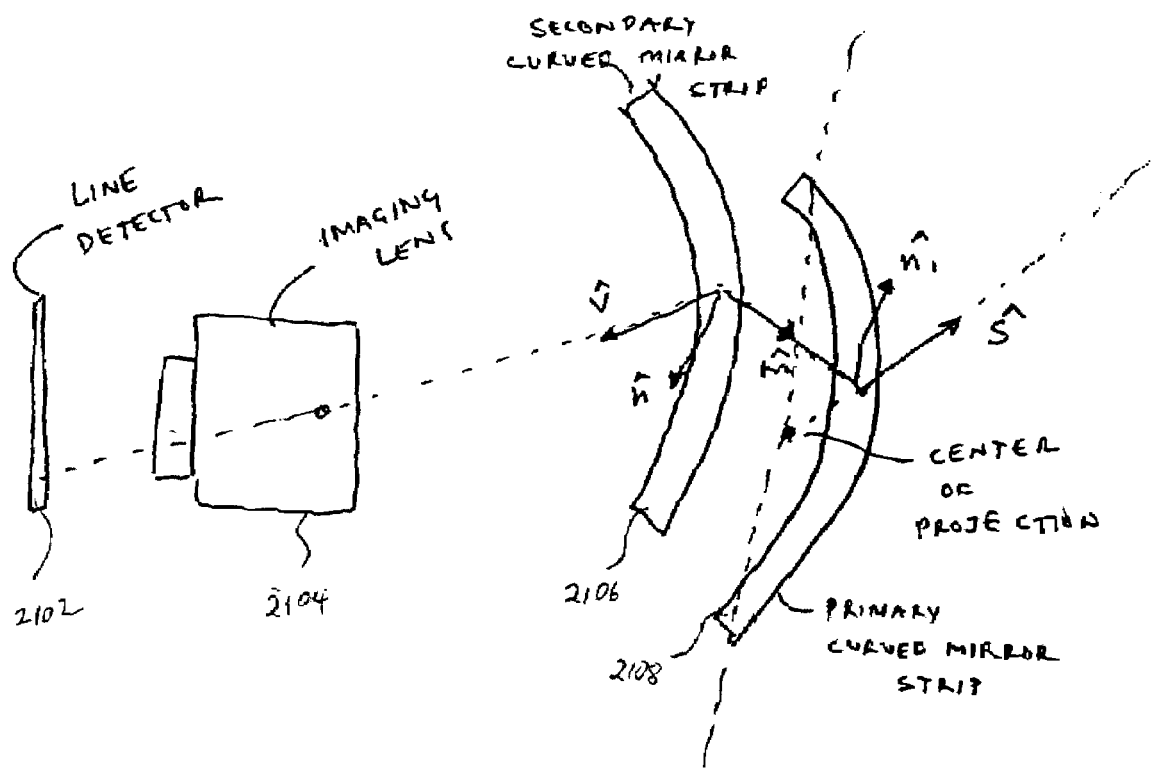
FIG. 21 is an embodiment of a system for acquiring image slices using a line detector.

A 180 degree or greater image slice can also be captured using a line image detector. Line detectors have a linear array of pixels closely packed together. FIG. 21 illustrates a slice acquisition system using a line detector 2102, an objective lens 2104 and two strips of curved mirrors 2106, 2108. Each scene ray that approaches the center of projection of the imaging system is reflected by the primary curved mirror 2108 in the direction of the secondary mirror 2106. The secondary mirror 2106 then reflects this ray towards the entrance pupil of the imaging lens 2104. All reflected rays lie on a plane so that the resulting image is formed on the line sensor.

If the direction of the scene ray is s, the direction of the reflected ray v, the direction of the line joining the reflecting points is m, the surface normals at the reflection points are $n_1$ and $n_2$ are:

$$n_1 = \frac{s - m}{\|s - m\|} \quad (6)$$

$$n_2 = \frac{v + m}{\|v + m\|} \quad (7)$$

Figure 22:
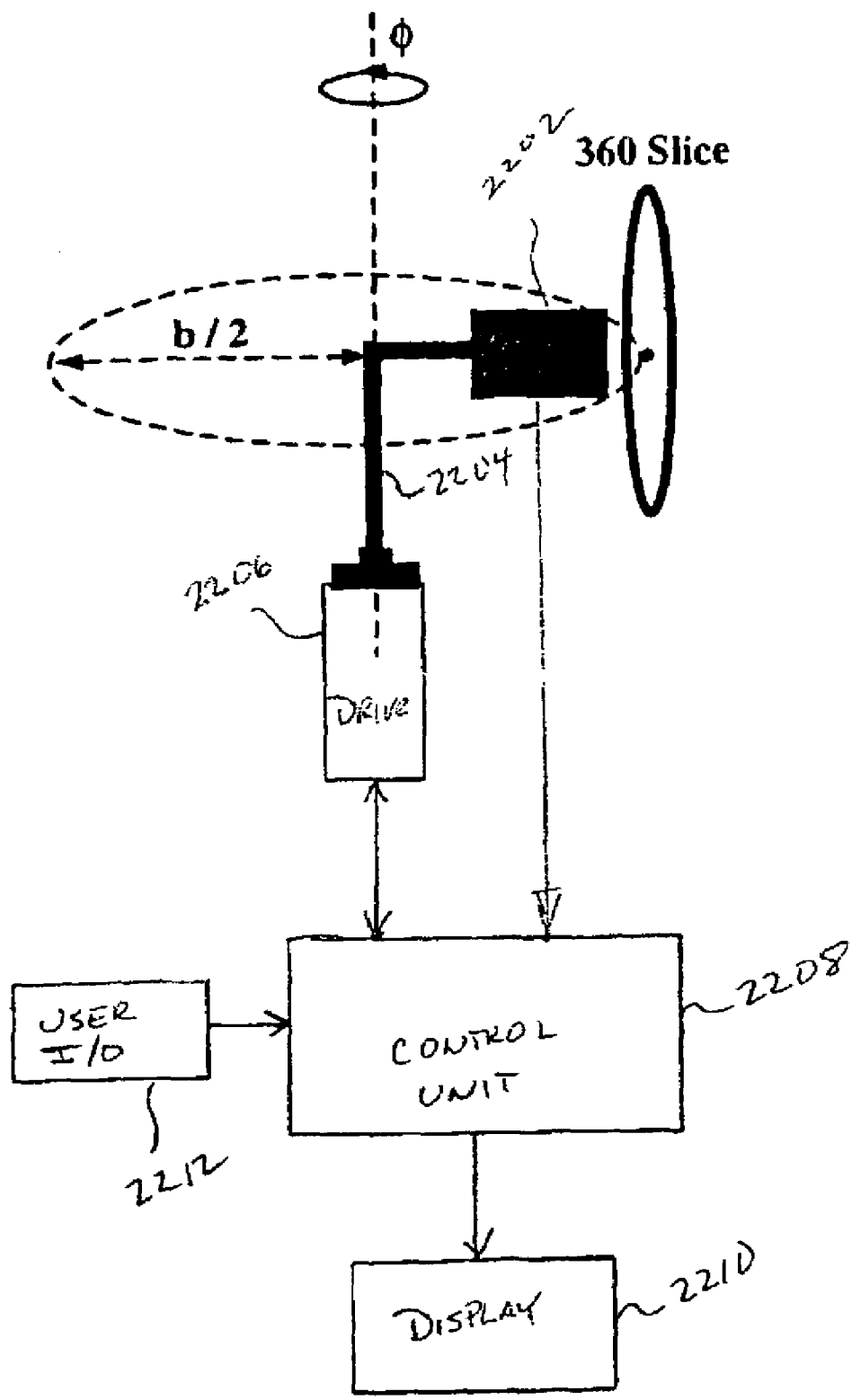
FIG. 22 is a block diagram of an imaging system in accordance with the present invention and illustrating the rotation of a slice camera offset from the axis of rotation to acquire stereoscopic image data in a single rotation.

FIG. 22 is a schematic diagram of an exemplary system for generating and manipulating spherical mosaics in accordance with the present invention. The system includes a slice camera 2202 which is rotated about an axis of rotation 2204 by a motorized drive unit 2206. The slice camera 2202 can take any number of forms, including those illustrated in FIGS. 17–20. A control unit 2208 is provided to receive the slice image data from the slice camera 2202 and to control the rotation of the drive unit 2206. The drive unit 2206 can be a linear motor and include a sensor to provide rotational positional information to the control unit 2208. Alternatively, the drive unit 2206 can take the form of a stepper motor which induces a fixed amount of rotation in response to a received control signal from the control unit 2208. In either case, the image acquisition by the slice camera is performed at known rotational positions about the axis of rotation 2204. As illustrated in FIG. 22, the slice camera 2202 can be offset from the axis of rotation 2204 by a small radial distance, designated as b/2. As will be described below, this allows stereoscopic images to be rendered from a single rotation about the axis of rotation 2204.

The system further includes a display unit 2210 and user input device 2212, such as a digital pointer or "mouse". The display unit 2210 is used to display the spherical mosaic images to a user and also operates in cooperation with the input device 2212 and control unit 2208 to form a graphical user interface to the system. The control unit 2208, user input device 2212 and display 2210 can be embodied in a conventional personal computer platform operating under the control of appropriate software.

Figure 23:
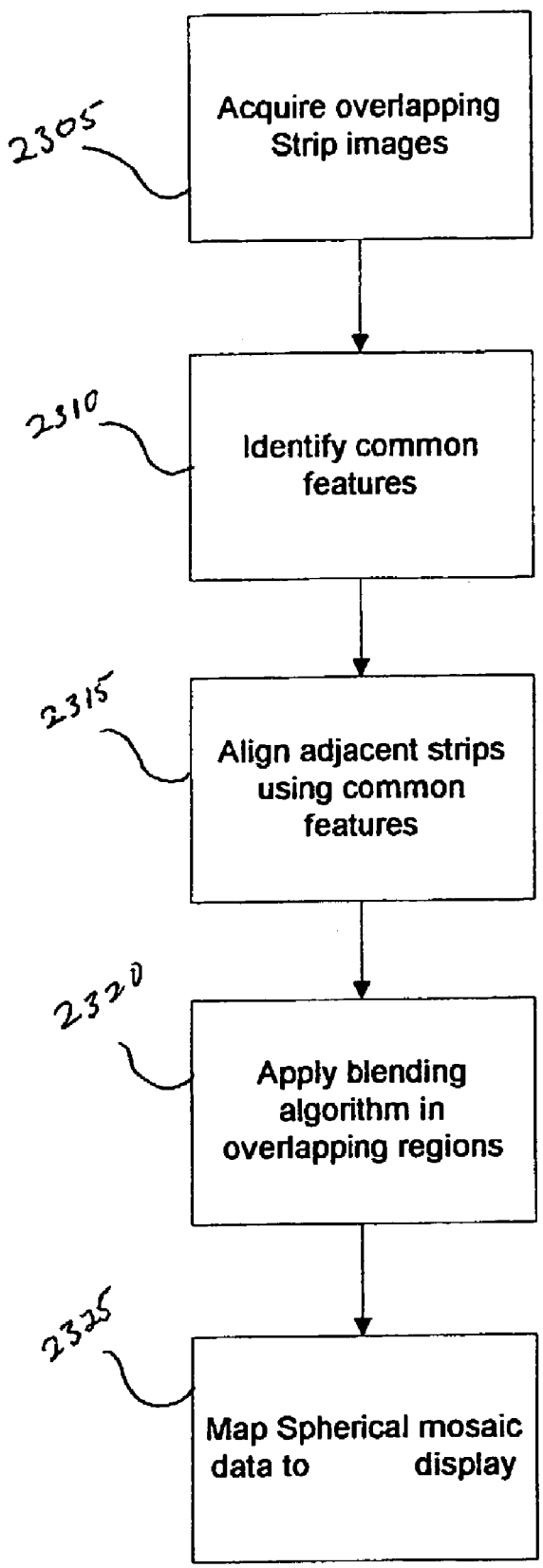
FIG. 23 is a flow chart illustrating a method of generating a spherical mosaic using overlapping strip images.

Methods for creating an omnidirectional mosaic/image using rotating catadioptric imaging systems will now be described. Two types of imaging systems have been described above. The first system type is for the acquisition of image strips. In the case of image strips, it is possible to acquire overlapping strip image data without knowledge of the rotational position of the imaging system during image acquisition. FIG. 23 is a simplified flow chart illustrating a method of generating a spherical mosaic using such overlapping, strip images. Referring to FIG. 7A, as the strip image system is rotated about the axis of rotation (z-axis in FIG. 7A), strip images are acquired at various rotational positions ($\phi$) about at least 180 degrees of rotation (step 2305).

Next, the overlapping strip image data is processed using conventional image processing techniques to identify common features in the image strips to determine the relative alignment of the image strips in the spherical mosaic (step 2310). A variety of methods can be used for feature identification and alignment. For example a sum-of-square-difference (SSD) measure can be used to identify similar windows within consecutive images. To determine the similarity measure of a feature window centered at a location (x,y) in a first image (k) and a window centered at a point (i,j) in the second image (K-1), the SSD measure (for a 5 pixel×5 pixel window) is computed as:

$$E(i, j) = \sum_{m=-2}^{m=2} \sum_{n=-2}^{n=2} (I_k(x - m, y - n) - I_{k-1}(i - m, j - n))^2 \quad (8)$$

where, $I^k$ and $I^{k-1}$ denote brightness/color values in the two images. The value of (i,j) in image k-1 that gives the lowest value of E is taken to be the best match for the feature (x, y) in image k. This process is repeated so that a significant number of features are matched. Note that each image feature can be mapped to a vector P in its reference frame. Therefore, the set of matching features correspond to a set of matching vectors in the frames k and k-1. Hence, equation (18) (infra) can be used to solve for the rotation matrix $R_{k-1,k}$ using a variety of techniques. The rotation matrix can either be solved using linear, nonlinear, or search techniques. In our case, we have used the SIMPLEX search algorithm to find the $\alpha_k$, $\beta_k$ and $\gamma_k$ values that best satisfy equation (18) (infra) for given set of matching features. Note that since the rotation between all consecutive frames can be computed in this manner, the rotation $R_k$ of the most recent frame with respect to the coordinate frame of the mosaic (first frame) is easily determined using equation (16) (infra). Once common features are identified, these features can be used as a datum for combining overlapping strips into the spherical mosaic (step 2315). A blending algorithm, discussed above, can then be used to adjust the color and intensity of the spherical mosaic in those regions where adjacent strips overlap (step 2320). Finally, the resulting spherical mosaic data is mapped to a display (2325).

In the case of unknown rotations, such as the method of FIG. 23, it is expected that the estimated rotations will have errors due to inaccuracies in the feature matching and estimation procedure. As a result, the blending in the overlap regions will not be perfect and will tend to give rise to blurring of the mosaic. This is because the multiple measurements in the overlap regions will be displaced with respect to their desired locations and hence will not correspond to exactly the same scene point. To overcome this problem, a fine matching algorithm can be used. The fine matching algorithm involves searching through the rotation space in a small neighborhood around the estimated rotation parameters for the best match between the two strips in their overlap region. In other words, the strip k is recomputed for a finite number of samples within the rotation space:

$$\alpha - \delta\alpha \leq \alpha' \leq \alpha + \delta\alpha \quad (9)$$

$$\beta - \delta\beta \leq \beta' \leq \beta + \delta\beta \quad (10)$$

$$\gamma - \delta_\gamma \leq \gamma' \leq \gamma + \delta_\gamma \quad (10A)$$

For each rotation used, the overlapping regions of the two strips are compared using the sum-of-square-difference (SSD) given by equation (8). In this case, the SSD value E is computed using the entire region of overlap between the two strips (and not just a small window). The set of rotation angles $\alpha'$, $\beta'$ and $\gamma$ that minimize E is taken to be the correct rotation estimate and the corresponding position of the strips is used to blend the strips together. Again, blending is performed using weights that correspond to the distances $d_1$ and $d_2$ of a mosaic pixel from the closest boundaries of the strips.

Figure 24:
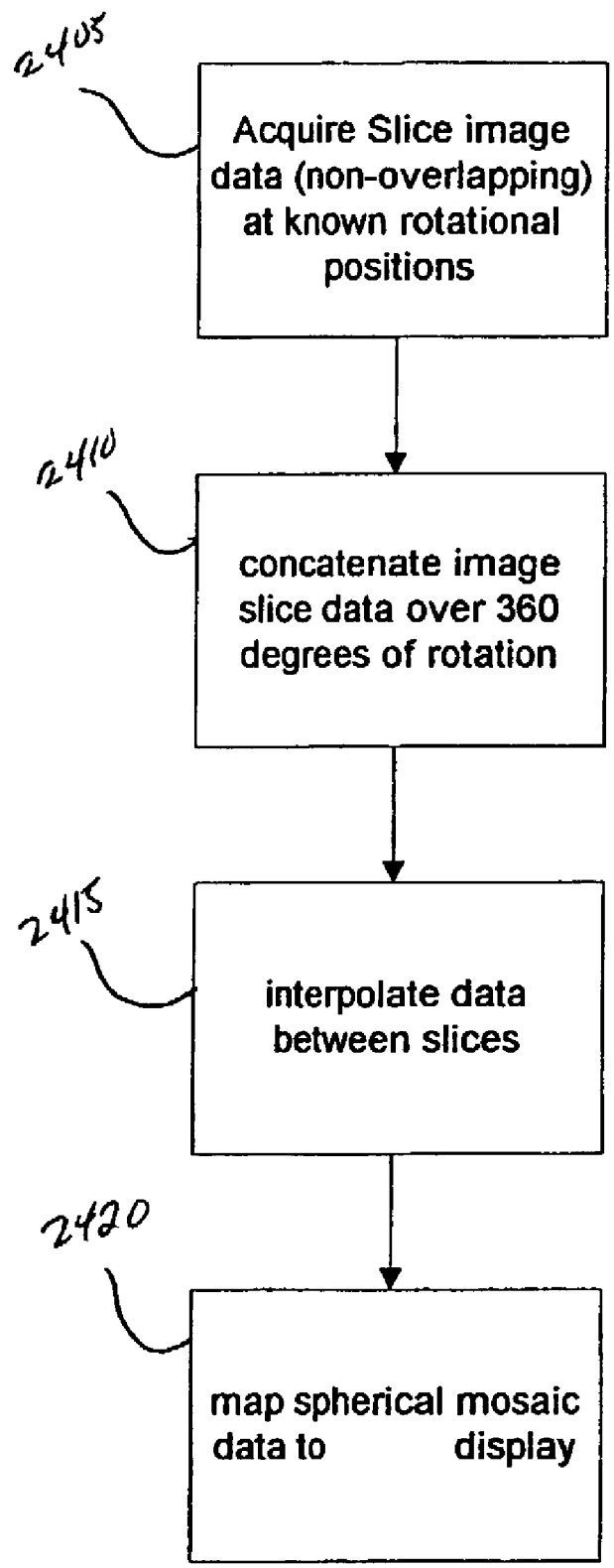
FIG. 24 is a flow chart illustrating a method of generating a spherical mosaic using slice images or non-overlapping strip images.

In the case of image slices and non-overlapping image strips, the rotational position of the imaging sensor must be known for each acquired image slice. The system described in connection with FIG. 22 is suitable for such an application. FIG. 24 is a flow chart which illustrates the process of generating and displaying spherical mosaic data from non-overlapping image slice data. First, non-overlapping image slices are acquired at known rotational positions about the axis of rotation of the imaging system (step 2405). The rotational positions can be acquired using an appropriate sensor and/or through a drive mechanism which is calibrated with respect to an applied control signal, as discussed in connection with FIG. 22. With the rotational position of the image slice data known, adjacent image slice data is concatenated over the full rotational range of the imaging system (step 2410). As the image slices are not overlapping, there is likely small regions between adjacent image slices which are not captured. Therefore, interpolation can be performed to smooth the regions between image slices, if necessary (step 2415). Finally, the spherical mosaic data is then mapped to a display (step 2420).

Figure 25A:
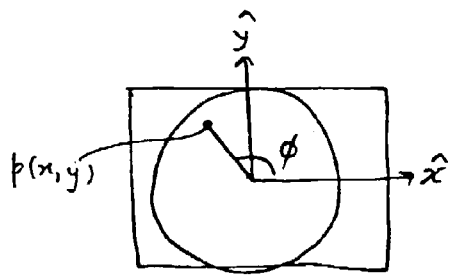
FIGS. 25A and 25B are diagrams illustrating the mapping of image data to the spherical mosaic.
Figure 25B:
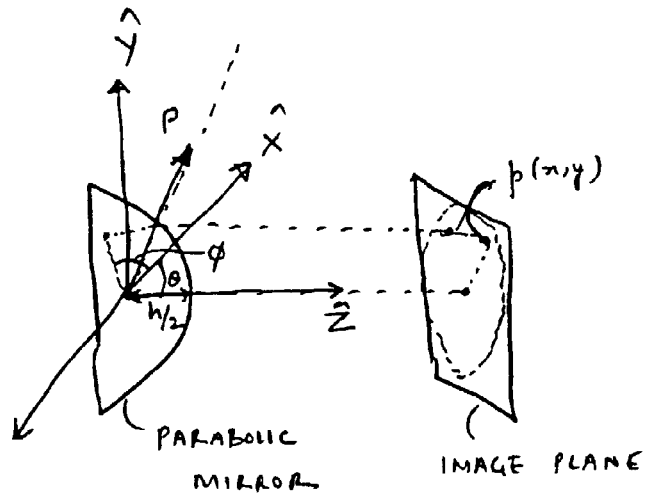

The image data acquired in step 2405, which is of known rotational position, must be mapped to the spherical mosaic. This entails mapping from locations in the image to corresponding locations within the reference frame of the mosaic, such as shown in FIG. 1A. In this reference frame a point may be represented by its polar angles $(\theta,\phi)$ or the Cartesian coordinates of the corresponding unit vector P $[X, Y, Z]^T$. The specific mapping will depend on the catadioptric imaging system used. FIGS. 25A and 25B illustrate an exemplary mapping in the case of an imaging system which uses a parabolic mirror section, a relay lens, an objective lens and an image sensor. In this case, the projection of rays from the mirror to the image sensor is orthographic, i.e., all reflected rays are parallel to the optical axis as shown in the figure. With the Z-axis of the mosaic frame aligned with the optical axis of the imaging system, the azimuthal angle of the scene ray can be determined from the image coordinates (x, y):

$$\phi = \tan^{-1}\frac{y}{x} \qquad (11)$$

The distance of the reflecting mirror point from the optical axis is:

$$r = \sqrt{x^2 + y_2} \qquad (12)$$

The profile of the parabolic mirror section is given by:

$$z(r) = \frac{h^2 + r^2}{2h} \qquad (13)$$

where, h is the parameter of the parabola. Hence, the zenith angle of the scene ray is determined as $$\theta = \tan^{-1}\frac{r}{z} \qquad (14)$$

Note that once the polar angles $(\theta,\phi)$ are determined the points can readily be mapped to the Cartesian coordinates $P[X, Y, Z]^T$ using:

$$X = \sin\theta\cos\phi$$

$$Y = \sin\theta\sin\phi$$

$$Z = \cos\phi \qquad (15)$$

As mentioned previously, the catadioptric strip or slice camera is rotated to capture a sequence of images. The frame of reference of the mosaic is generally defined with respect to the first orientation (or image) of the imaging system. Then, all subsequent measurements are mapped to this coordinate frame, taking the rotation into consideration. To do this, two coordinate frames are defined: the first being the fixed frame of the computed mosaic and the second being a frame that this attached to the imaging system and is rotated with respect to the mosaic frame. We will denote the rotation of orientation k with respect to the fixed frame as $R_k$. This rotation can be computed as the product of the rotations between subsequent orientation $R_{k-1,k}$:

$$R_k = R_{0,1} R_{1,2} \ldots R_{k-1,k} \qquad (16)$$

Each rotation between consecutive frames can be described in terms of the Euler angles $(\alpha_k, \beta_k, \gamma_k)$:

$$R_{k-1,k} = \begin{bmatrix} 1 & 0 & 0 \\ 0 & \cos\alpha_k & -\sin\alpha_k \\ 0 & \sin\alpha_k & \cos\alpha_k \end{bmatrix} \begin{bmatrix} \cos\beta_k & 0 & \sin\beta_k \\ 0 & 1 & 0 \\ \sin\beta_k & 0 & \cos\beta_k \end{bmatrix} \qquad (17)$$
$$\begin{bmatrix} \cos\gamma_k & -\sin\gamma_k & 0 \\ \sin\gamma_k & \cos\gamma_k & 0 \\ 0 & 0 & 1 \end{bmatrix}$$

where, $\alpha_k$ is a rotation about the Z-axis, $\beta_k$ is a rotation about the new Y-axis, and $\gamma_k$ is a rotation about the new X-axis. Therefore, a point $P_k$ in the $k^{th}$ is easily mapped to the $k-1^{th}$ frame by:

$$P_{k-1} = R_{k-1,k} P_k \qquad (18)$$

Once the rotation matrices are computed from the Euler angles, the image measurements can be mapped to the mosaic. The mosaic itself may be rendered on a sphere or a spherical panorama or any other representation of the polar angles $(\theta,\phi)$ as illustrated in FIG. 1.

Either image slices or strips (as defined earlier) produced by an imaging system can be mapped to construct a complete mosaic from a single rotation of the imaging system. In the case of slices, which cannot overlap, the slices may be concatenated. In the case of image strips, the strips may either be concatenated or blended together where consecutive strips overlap.

Figure 26:
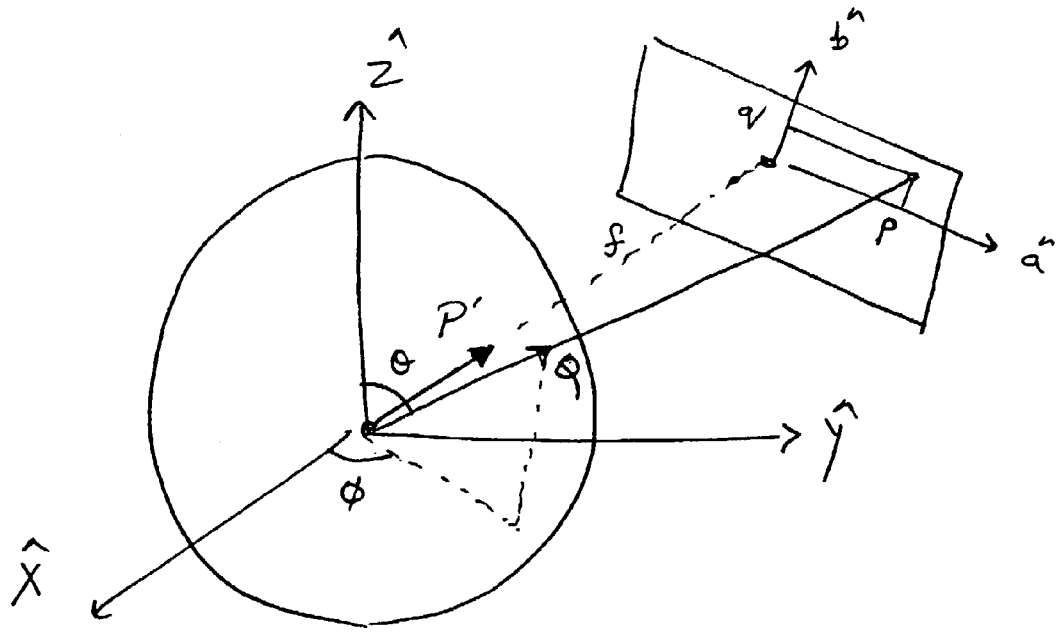
FIG. 26 is a perspective diagram illustrating the projection of a portion of the spherical mosaic into a plane to generate a perspective image.

Once an omnidirectional mosaic has been computed, such as described in connection with FIGS. 23 and 24, any part of this mosaic can be mapped to a substantially distortion free perspective view of the corresponding part of the scene. This can be done via a geometrical mapping method. Referring to FIG. 26, a virtual camera view is defined by the polar angle $\theta'$, $\phi'$ of the viewing direction of the virtual camera. These angles can be mapped to the viewing unit vector P' using equation (15). For an effective focal length of the virtual camera off and the desired perspective having its two axes aligned with the unit vectors a and b which are orthogonal to each other and orthogonal to the viewing vector P', a pixel location (p, q) in this image is mapped to the mosaic frame of reference by computing the corresponding unit vector Q=P/‖P‖ where:

$$P = fP' + pa + qb \qquad (19)$$

Once Q has been computed, the corresponding polar angles can be determined from equation (15). Once the polar angles are determined, the corresponding brightness value can be obtained from the representation used to store the mosaic. This brightness value is filled in the location (p, q) of the virtual camera image.

The geometrical mapping can be performed in real time such that a user can vary the viewing vector and the focal length using an interactive device such as a computer mouse. The resulting virtual camera image can be displayed on the computer screen and the user can freely navigate around the 360 degree×360 degree space. Alternatively, a head-mounted display may be used to view the generated mosaic. As the user turns, the head mounted display provides the computer the orientation (viewing direction) of the user. The appropriate perspective image can then be computed and displayed on the head-mounted display.

Stereoscopic Omnidirectional Mosaics

The methods presented above can be used to develop an omnidirectional mosaic that is stereoscopic. This allows a user to "look around" the scene while perceiving the relative depths of objects in the scene. It is well known that stereoscopic viewing requires two different views of the scene to be captured so that the two different views can be presented to the two eyes of the observer to produce depth perception. As noted in connection with FIG. 22, this principle can be used in the context of spherical mosaics to generate a stereoscopic representation of the scene that permits user to look in any direction.

FIGS. 27 A–C illustrate an imaging system being rotated about an axis that is radially offset with respect to the center of projection b, such as is illustrated in FIG. 22. The radial distance between the rotation axis and the center of projection is b/2. The acquired image sections can take the form of strips or slices. As is illustrated in FIG. 27, the center of projection travels along a circle defined by radius b as the system is rotated through a range of 360 degrees.

Figure 27A:
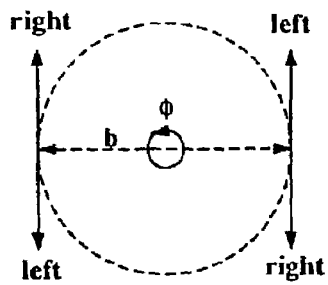
FIGS. 27A–C are top view diagrams illustrating the acquisition of left and right side images as an imaging system is rotated about a point which is radially offset from the center of projection.

FIG. 27A illustrates the left and right views, offset by 180 degrees of rotation, for each scene point that are produced by a single off-axis rotation of the imaging system. For the image that is captured at angle ψ and ψ+π, the left section of field of view strip at angle ψ and the right section of strip at angle ψ+π correspond to two different views of the same part of the scene captured with an approximate baseline of b. Thus, left and right strips (or slices) that are taken from images that are approximately diametrically opposite to one another have a baseline b and all scene points are viewed from two view points that have a baseline of b. As a result, two spherical mosaics can be constructed from this single rotation. One mosaic can be constructed from the sequence of 180 degree left strips (or slices) (denoted by L) and the other from the sequence of 180 degree right strips (or slices) (denoted by R). If the two mosaics are constructed simultaneously, the first strip in the left mosaic is positioned at φ=ψ and the first strip in the right mosaic is positioned at φ=ψ+π. The image strips or slices are then combined using the mosaicing approaches discussed above, such as with reference to FIGS. 23 and 24.

Figures 27B, 27C:
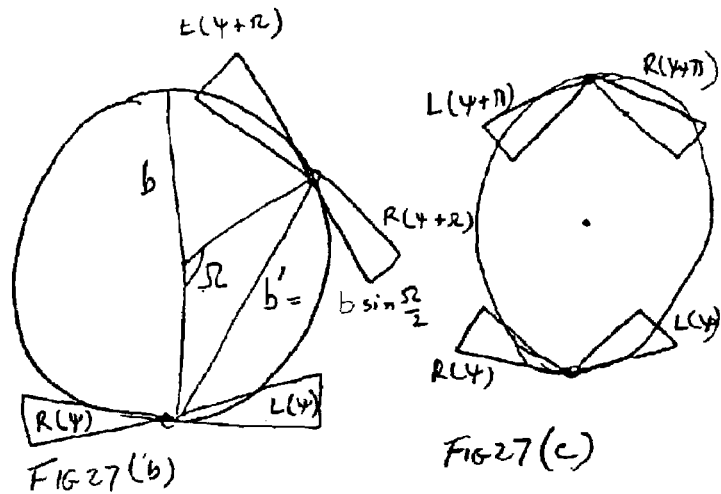

It should be noted that the field of view of the imaging system can be an image slice rather than a strip. In this case the left and right halves of the slice are concatenated together to construct the left and right mosaics, respectively. Also, as shown in FIG. 27B the angular displacement between the left and right views does not have to be π. For example, if the displacement is some arbitrary value Ω, the two views are verged and have a baseline of $$b' = b\sin\frac{\Omega}{2} \quad (22)$$

In the embodiments discussed above, the image strip that is captured by the imaging camera is tangential to the circle of rotation. However, this does not have to be the case. The imaging system can be constructed such that the left and right strips (or slices) point away from the tangent to the circle of rotation as shown in FIG. 27C.

Figure 28A:
FIG. 28 A is a perspective view illustrating exemplary changes in observation point a human viewer can exhibit.
FIG. 28B is a perspective view illustrating the generation of left and right perspective views from left and right mosaics, respectively.

A property of the above method is that the stereoscopic information that is captured is complete (in field of view) and is accomplished with a single rotation of the imaging system. The two viewpoints for any scene point remain fixed on the circle of rotation. Moreover, the distance (baseline) between the viewpoints also remains fixed when the same parts of the image are used for the left and right views. Hence, the data that is obtained is sufficient to compute stereo views for the head movements shown in FIG. 28A. All stereo data that results from panning and tilting the head is embedded in the spherical stereo mosaic.

Figure 28B:
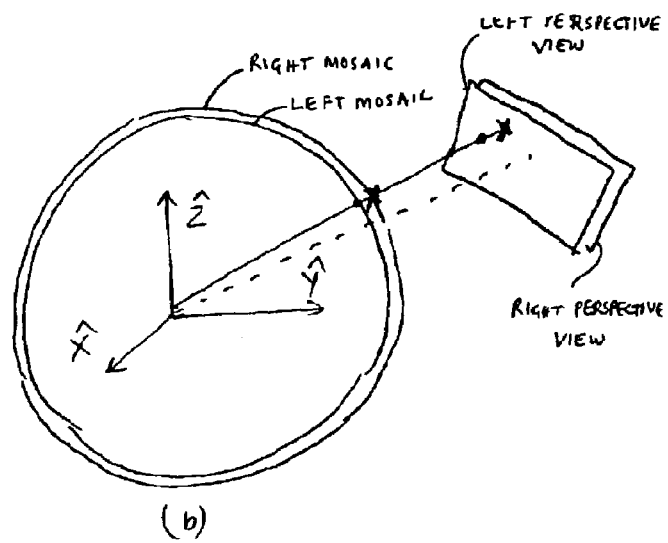

As illustrated in FIG. 28B, there are two (left and right) mosaics that are used to compute the left eye and right eye perspective views for any given head orientation. These views can be displayed on the left and right displays of the head-mounted display so that the three-dimensional structure of the scene can be observed by a user. If a head-mounted display is not available for stereoscopic viewing of the mosaics, passive stereo glasses may be used where the left side of the glass has a red filter and the right side has a blue filter. Then, the perspective stereo image is displayed on the computer screen by taking the red channels of the perspective view from the left eye mosaic and the green and blue channel from the right eye mosaic. When navigating around the stereo mosaic, the user will perceive three-dimensional structure while freely exploring the scene.

It should be noted that a catadioptric imaging system is not required for the capture of spherical stereo mosaics. A very wide angle imaging system, such as one that uses a fish eye lens, can also be used to capture the images. Again, in this case, there exists a unique mapping from measured image points (x, y) to the polar angles (θ,φ) that are defined in the cartesian reference frame $P[X, Y, Z]^T$ that is attached to the center of projection of the imaging system. Hence, 180 degree or 360 degree slices or strips of the field of view can be obtained from this image data and once these slices and strips are mapped to the mosaic representation, they can be processed in the same manner as described for the catadioptric imaging system. For a simple spherical mosaic, the fish eye system is rotated about its center of projection and for a stereo mosaic it is rotated about a position which is radially offset from its center of projection. Again, as in the catadioptric case, the rotations may be known or unknown and estimated using matching features in consecutive image frames.

Omnidirectional Depth Maps

The systems and methods described above for generating a stereoscopic image can be used to generate omnidirectional depth maps. The imaging system used provides slices or strips that are at least 180 degrees in one of the two dimensions of the strip or slice. The easiest way to compute a depth map is to use the left and right stereo mosaics, which are shown as spherical panoramas in FIGS. 29A and 29B.

Note that the point $q_l$ and $q_r$ in the left and right mosaics of FIGS. 29A and 29B, respectively, correspond to the same scene point. A feature matching algorithm, like the one used for rotation estimation discussed in connection with FIG. 23, can be applied to the two mosaics. This yields a matching feature in the right image for each feature in the left image. These matching features correspond to the same physical point in the scene, the three-dimensional coordinates of which can then be computed using the geometric model which is illustrated in FIG. 29C. The two mosaic points are mapped to their corresponding polar angles which are in turn mapped to unit viewing vectors in Cartesian coordinates. The coordinate frames for the two vectors are different as the left and right images of this scene point were captured from different viewpoints resulting from the radial offset in rotation, (b/2). Hence, the two reference frames are separated by the baseline b'. The intersection of the lines l and r in the directions of the viewing vectors $P_l$ and $P_r$ determines the coordinates S of the scene point in three-dimensional space. By repeating this process for all features in the left and right mosaics, a complete depth map of the scene can be determined.

As an alternative to using the left and right mosaics for the computation of depth, greater accuracy can be obtained by using the sequence of original image sections captured during rotation. These image sections are illustrated in FIG. 30. Note that these images correspond to discrete orientations (denoted by $\psi_1, \psi_2 \ldots \psi_N$ in FIG. 30) of the imaging system. If the imaging system produces a strip rather than a slice, the same scene point will be seen on one side of the strip (say left side) in a part of the sequence of images, then it will not appear for a part of sequence, and then will reappear on the other side of the strip for another part of the sequence. Note that all images of the point correspond to different views of the point. The corresponding viewing vectors are shown in FIG. 31.

Figure 31:
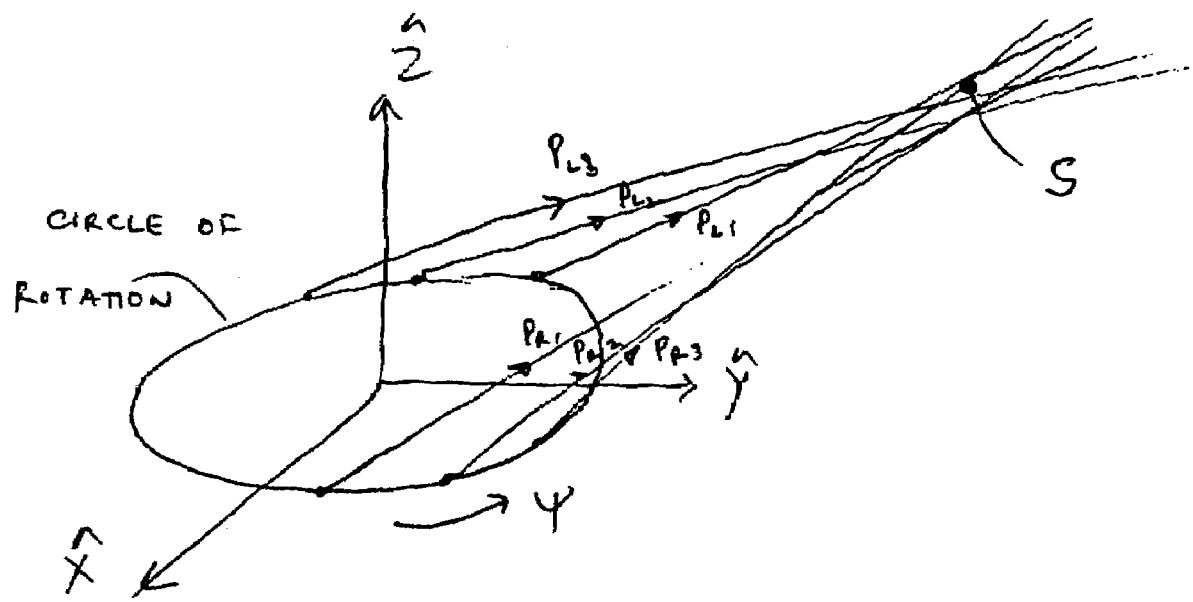
FIG. 31 is a perspective model illustrating the calculation of the depth of a scene point using the plurality of images of FIG. 30.

Referring to FIG. 31, the bundle of lines ideally intersect at the same point S, which is the three-dimensional coordinates of the scene point. However, due to inaccuracies in the measurements as well as computations, it is likely that the lines will not meet at a point. This is almost always the case in any type of stereo measurement. Hence, the bundle of lines can be used to determined to scene point location that has the shortest average distance from the bundle of lines. The coordinates of the point S can be accurately computed from the bundle of lines using a standard regression method. Since different pairs of lines correspond to different baselines in this case, this is really a form of multi-baseline stereo. The computed three-dimensional map of the scene can be stored as a 360 degree×360 degree spherical mosaic, as a spherical panorama, or any other convenient representation.

Figure 32:
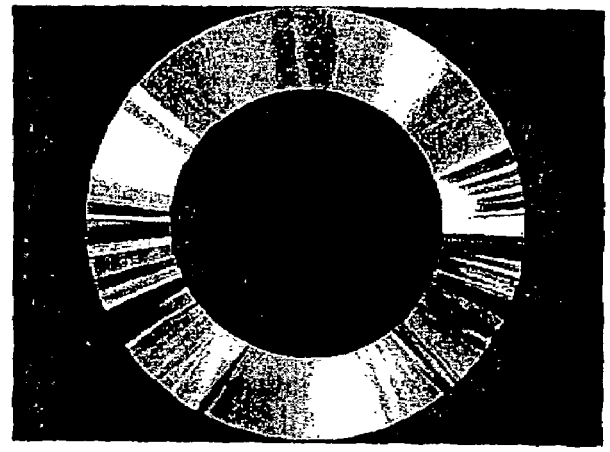
FIG. 32 is an exemplary slice image acquired by a slice camera in accordance with the present invention.

An exemplary imaging system, substantially in accordance with FIG. 22, has been implemented using a conical mirror having a 65 mm outer diameter in conjunction with a telecentric lens to direct image slices to a conventional digital video camera (Canon model Optura). The rotation system includes a motorized turntable manufactured by Daedal. The center of projection of the slice camera was offset from the center of rotation of the turntable by three inches, thus providing a stereo baseline separation of six inches. A complete rotation of the slice camera was performed over a three minute interval over which approximately 5,000 image slices were acquired. An example of an image slice acquired by the system is illustrated in FIG. 32.

Figure 33A:
FIGS. 33A and 33B are left and right spherical mosaic images, respectively, formed in accordance with the present invention.
Figure 33B:
Figures 34A, 34B:
FIGS. 34A and 34B are left and right perspective images, respectively, formed in accordance with the present invention.

Exemplary left and right spherical mosaic images generated from the image slices are illustrated in FIGS. 33A and 33B respectively. Each mosaic is 4000×2000 pixels. FIGS. 34 A and 34 B illustrate left and right perspective views, respectively, of a section of the spherical image.

The systems and methods of the present invention have been described in connection with certain embodiments thereof. It will be appreciated that changes and modifications to these embodiments will be apparent to those skilled in the art. Such changes and modifications are encompassed by the present invention as set forth in the appended claims.

The invention claimed is:

1. An imaging system for acquiring an omnidirectional mosaic image comprising: an image slice camera having a large field of view in a first direction and a small imaging width in a second direction, the image slice camera receiving rays of light incident on the camera within the large field of view, at least a portion of said incident rays being substantially parallel to each other with respect to said second direction, said portion of rays being directed to an area of an imaging sensor to form image slice data; a rotational drive system operatively coupled to the image slice camera, the rotational drive system rotating the image slice camera along an axis of rotation substantially parallel to the first direction; a control unit operatively coupled to the rotational drive system and image slice camera, the control unit receiving the image slice data from the image slice camera and recording corresponding rotational positional information of the rotational drive system, the control unit acquiring a plurality of image slices at known rotational positions and concatenating said image slices to form an omnidirectional mosaic image data.

2. The imaging system of claim 1, further comprising an output device coupled to the control unit for displaying an omnidirectional mosaic image from the omnidirectional mosaic image data.

3. The imaging system of claim 1, wherein the slice camera comprises: an imaging lens having an entrance pupil; a non-convex mirror section receiving the parallel rays and directing said portion of rays onto the entrance pupil of the imaging lens; an imaging sensor, the imaging sensor being responsive to the rays which are incident on the entrance pupil of the imaging lens.

4. The imaging system of claim 1, wherein the slice camera comprises: an imaging sensor; a telecentric lens arrangement; and a conical mirror section, the conical mirror section receiving said incident rays and directing said portion of rays onto the telecentric lens arrangement whereby only said portion of rays are directed to the imaging sensor.

5. The imaging system of claim 1, wherein the slice camera comprises: a first mirror section receiving said incident rays; a second mirror section; and an imaging sensor, the second mirror being positioned to receive said portion of rays from the first mirror and direct said portion of rays to the imaging sensor.

6. The imaging system of claim 5, wherein the second mirror section has a near focus and a far focus and wherein the first mirror section projects said portion of rays through the near focus and the second mirror section directs said portion of rays to the image sensor located at a position proximate the far focus.

7. The imaging system of claim 6 wherein the near focus is located in front of the first mirror section and the far focus is located behind the first mirror section.

8. The imaging system of claim 1, wherein the slice camera comprises: an imaging sensor; a telecentric lens arrangement; and a plurality of stacked parabolic mirror sections receiving the incident rays and directing said portion of rays to the telecentric lens arrangement such that only said portion of rays are incident on the imaging sensor.

9. The imaging system of claim 1, wherein the slice camera has a center of projection and wherein the axis of rotation is radially offset from the center of projection.

10. The imaging system of claim 1, wherein the control unit generates left and right omnidirectional mosaic data from the image slices acquired in a single rotation about the axis of rotation.

11. The imaging system of claim 10, wherein said control unit provides the left and right omnidirectional mosaic data to the output device to form a stereoscopic image.

12. The imaging system of claim 11, wherein the output device includes left and right display portions for displaying the left and right omnidirectional mosaic data, respectively.

13. The imaging system of claim 12, wherein the output device is a head mounted display.

14. The imaging system of claim 9, wherein control unit calculates the depth of a plurality of points in the image from the left and right omnidirectional mosaic data.

* * * * *